(12) United States Patent
Kim et al.

(10) Patent No.: US 12,519,873 B2
(45) Date of Patent: Jan. 6, 2026

(54) METHOD AND DEVICE FOR PREVENTING DATA TRANSMISSION COLLISION IN WIRELESS POWER TRANSMISSION SYSTEM

(71) Applicant: LG ELECTRONICS INC., Seoul (KR)

(72) Inventors: Jaeyeol Kim, Seoul (KR); Seonghun Lee, Seoul (KR); Jinho Youn, Seoul (KR); Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 314 days.

(21) Appl. No.: 18/278,981

(22) PCT Filed: Feb. 25, 2022

(86) PCT No.: PCT/KR2022/002783
§ 371 (c)(1),
(2) Date: Aug. 25, 2023

(87) PCT Pub. No.: WO2022/182195
PCT Pub. Date: Sep. 1, 2022

(65) Prior Publication Data
US 2024/0146829 A1    May 2, 2024

(30) Foreign Application Priority Data

Feb. 25, 2021 (KR) .................. 10-2021-0025812

(51) Int. Cl.
*H04B 5/02* (2006.01)
*H02J 50/12* (2016.01)
(Continued)

(52) U.S. Cl.
CPC .............. *H04L 69/24* (2013.01); *H02J 50/12* (2016.02); *H02J 50/80* (2016.02)

(58) Field of Classification Search
CPC .... H04L 69/24; H04L 9/40; H04L 5/14; H02J 50/80; H02J 50/00; H02J 50/12; H02J 7/00034
(Continued)

(56) References Cited

U.S. PATENT DOCUMENTS

| | | | |
|---|---|---|---|
| 2012/0329405 A1* | 12/2012 | Lee .................. | H02J 50/12 455/73 |
| 2013/0057078 A1* | 3/2013 | Lee .................. | H02J 50/12 307/104 |

(Continued)

OTHER PUBLICATIONS

IP.com search history (Year: 2025).*

*Primary Examiner* — Moustapha Diaby
(74) *Attorney, Agent, or Firm* — LEE, HONG, DEGERMAN, KANG & WAIMEY

(57) ABSTRACT

The present disclosure relates to a method for transmitting data packet information, wherein the method is performed by a wireless power transmitter in a wireless power transmission system, and comprises the steps of: entering a power transfer phase; receiving a plurality of control error (CE) packets from a wireless power receiver during the power transfer phase; determining the intervals between the plurality of CE packets; and transmitting the data packet information to the wireless power receiver during the power transfer phase on the basis of the intervals, wherein the length of the data packet information is determined on the basis of the length of the intervals.

16 Claims, 36 Drawing Sheets

(51) Int. Cl.
  *H02J 50/80*   (2016.01)
  *H04B 5/00*   (2024.01)
  *H04B 5/20*   (2024.01)
  *H04B 5/40*   (2024.01)
  *H04L 69/24*   (2022.01)

(58) Field of Classification Search
  USPC ........................................................ 455/41.1
  See application file for complete search history.

(56) References Cited

U.S. PATENT DOCUMENTS

| | | | |
|---|---|---|---|
| 2014/0113689 A1* | 4/2014 | Lee ..................... | H01M 10/44 |
| | | | 455/573 |
| 2015/0214775 A1* | 7/2015 | Lee ..................... | H02J 50/12 |
| | | | 320/137 |
| 2015/0215005 A1* | 7/2015 | Toivanen ................. | H04B 5/79 |
| | | | 455/41.1 |
| 2019/0081518 A1* | 3/2019 | Park ..................... | H02J 7/00034 |
| 2019/0296799 A1* | 9/2019 | Park ..................... | H02J 50/402 |
| 2019/0372403 A1* | 12/2019 | Park ..................... | H04B 5/79 |
| 2021/0344235 A1* | 11/2021 | Youn .................... | G06F 11/004 |

* cited by examiner

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

FIG. 16

| | $b_7$ | $b_6$ | $b_5$ | $b_4$ | $b_3$ | $b_2$ | $b_1$ | $b_0$ |
|---|---|---|---|---|---|---|---|---|
| $B_0$ | Request | | | | | (mbs) | | |
| $B_1$ | Parameter | | | | | | | (lsb) |

FIG. 17

| | $b_7$ | $b_6$ | $b_5$ | $b_4$ | $b_3$ | $b_2$ | $b_1$ | $b_0$ |
|---|---|---|---|---|---|---|---|---|
| $B_0$ | Data | | | | | | | |
| ⋮ | | | | | | | | |
| $B_n$ | | | | | | | | |

FIG. 32

| Parameter | Side | Symbol | Minimum | Target | Maximum | Unit |
|---|---|---|---|---|---|---|
| Control Error interval | PRx | $t_{interval}$ | N/A | 250 | 350* | ms |
|  |  |  |  |  | 700 ↑ | ms |
| Control Error timeout | PTx | $t_{timeout}$ | 800 | 1,500 | 1,828 | ms |

METHOD AND DEVICE FOR PREVENTING DATA TRANSMISSION COLLISION IN WIRELESS POWER TRANSMISSION SYSTEM

CROSS-REFERENCE TO RELATED APPLICATION(S)

This application is the National Stage filing under 35 U.S.C. 371 of International Application No. PCT/KR2022/002783, filed on Feb. 25, 2022, which claims the benefit of earlier filing date and right of priority to Korean Application No. 10-2021-0025812, filed on Feb. 25, 2021, the contents of which are all incorporated by reference herein in their entirety.

TECHNICAL FIELD

This specification relates to wireless power transfer.

BACKGROUND

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, Bluetooth earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

Meanwhile, in a wireless power transfer system, it is intended to provide a method for preventing data transmission collision between a wireless power transmitter and a wireless power receiver and an apparatus using the same.

SUMMARY

According to one embodiment of the present specification, a method and apparatus for receiving a plurality of control error (CE) packets from a wireless power receiver, determining an interval between a plurality of CE packets and transmitting data packet information to the wireless power receiver based on the interval, where the length of the data packet information is determined based on the length of the interval, may be provided.

According to the present specification, since a protocol for coordinating communication between FSK/ASK is provided, an effect of reducing a possibility of communication collision during communication between a wireless power receiver and a wireless power transmitter may occur.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 16 is a diagram illustrating a format of a message field of an ADC data packet according to an embodiment, and FIG. 17 is a diagram illustrating a format of a message field of an ADT data packet according to an embodiment.

FIG. 32 schematically illustrates an example of a transmission period of a CE packet.

MODE

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDDCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented. The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
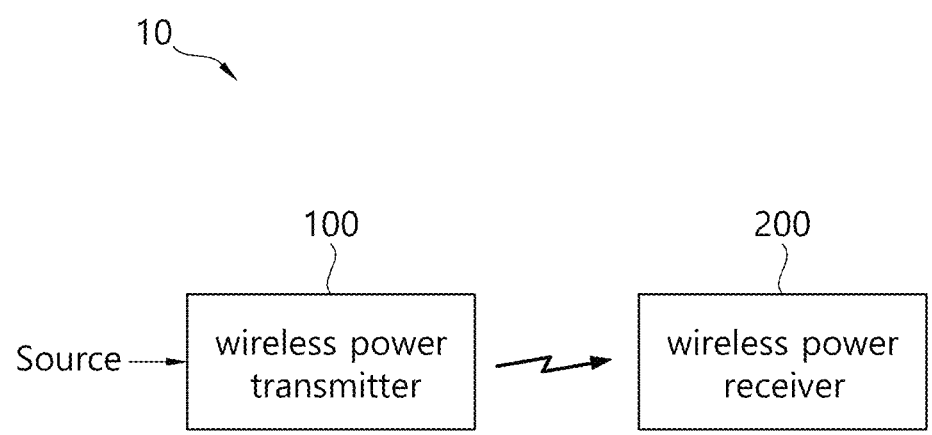
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source (S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, Bluetooth, Bluetooth low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
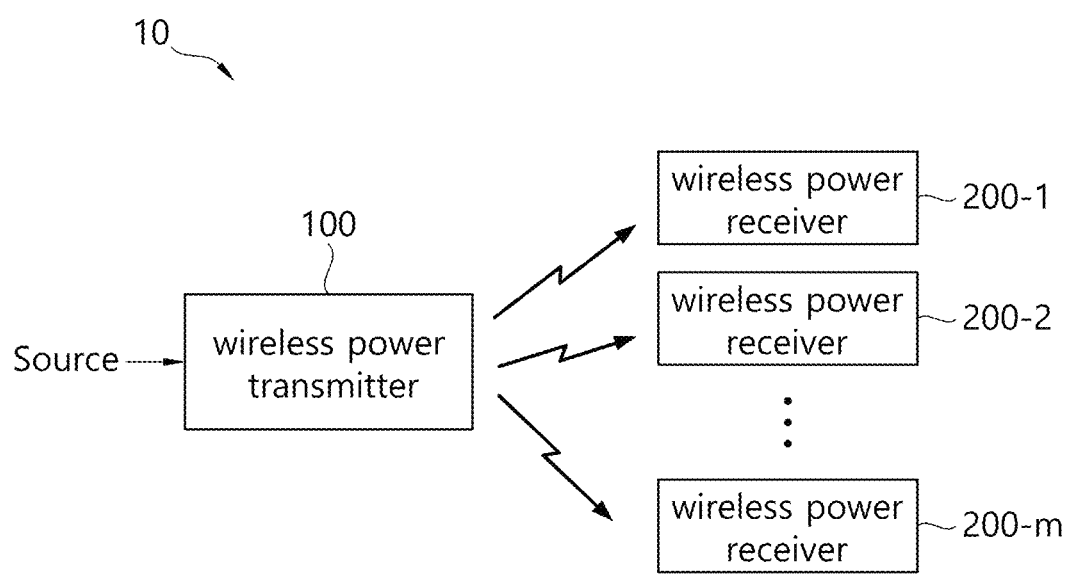
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figures 3, 4:
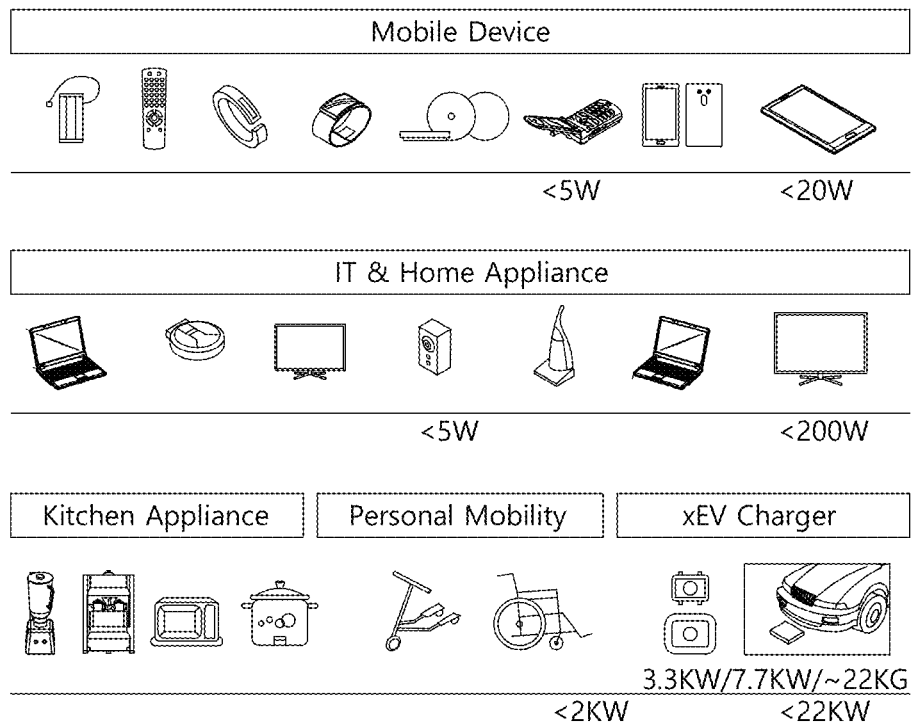
FIG. 3 shows an exemplary embodiment of diverse electronic devices adopting a wireless power transfer system.
FIG. 4 shows an example of a WPC NDEF in a wireless power transfer system.

FIG. 3 shows an exemplary embodiment of diverse electronic devices adopting a wireless power transfer system.

As shown in FIG. 3, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or recharged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30

W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an overvoltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 4 shows an example of a WPC NDEF in a wireless power transfer system.

Referring to FIG. 4, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1× Category 1 | 1× Category 1 |
| Class 2 | 10 W | 1× Category 3 | 2× Category 2 |
| Class 3 | 16 W | 1× Category 4 | 2× Category 3 |
| Class 4 | 33 W | 1× Category 5 | 3× Category 3 |
| Class 5 | 50 W | 1× Category 6 | 4× Category 3 |
| Class 6 | 70 W | 1× Category 7 | 5× Category 3 |

TABLE 2

| PRU | $P_{RX\_OUT\_MAX}$ | Exemplary application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

Figure 5:
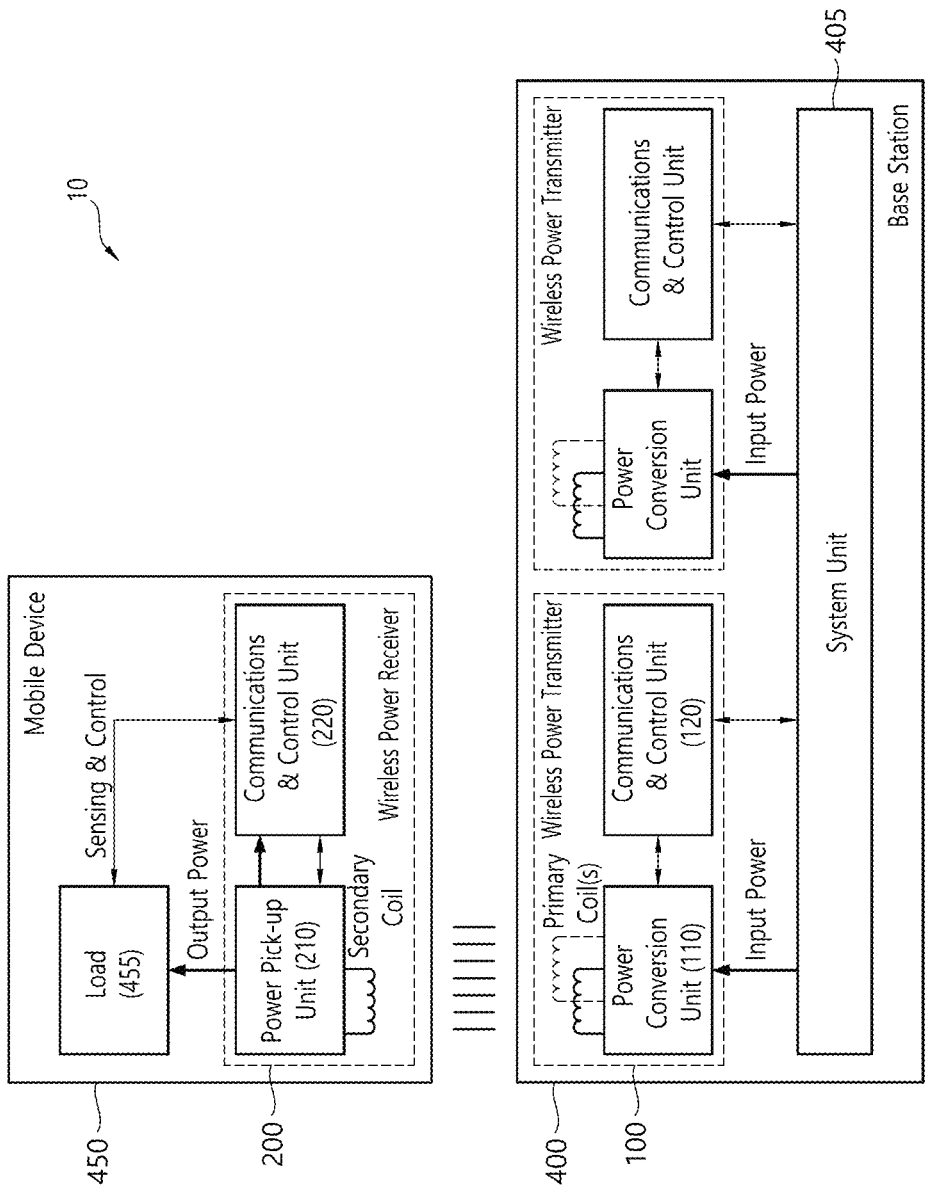
FIG. 5 is a block diagram of a wireless power transfer system according to another exemplary embodiment of the present disclosure.

As shown in Table 1, a maximum output power capability of Class n PTU may be equal to or greater than the $P_{TX\_IN\_MAX}$ of the corresponding class. The PRU cannot draw a power that is higher than the power level specified in the corresponding category. FIG. 5 is a block diagram of a wireless power transfer system according to another exemplary embodiment of the present disclosure.

Referring to FIG. 5, the wireless power transfer system (10) includes a mobile device (450), which wirelessly receives power, and a base station (400), which wirelessly transmits power.

As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, Bluetooth, Bluetooth LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 5, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, Bluetooth, Bluetooth LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, Bluetooth, Bluetooth LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 6:
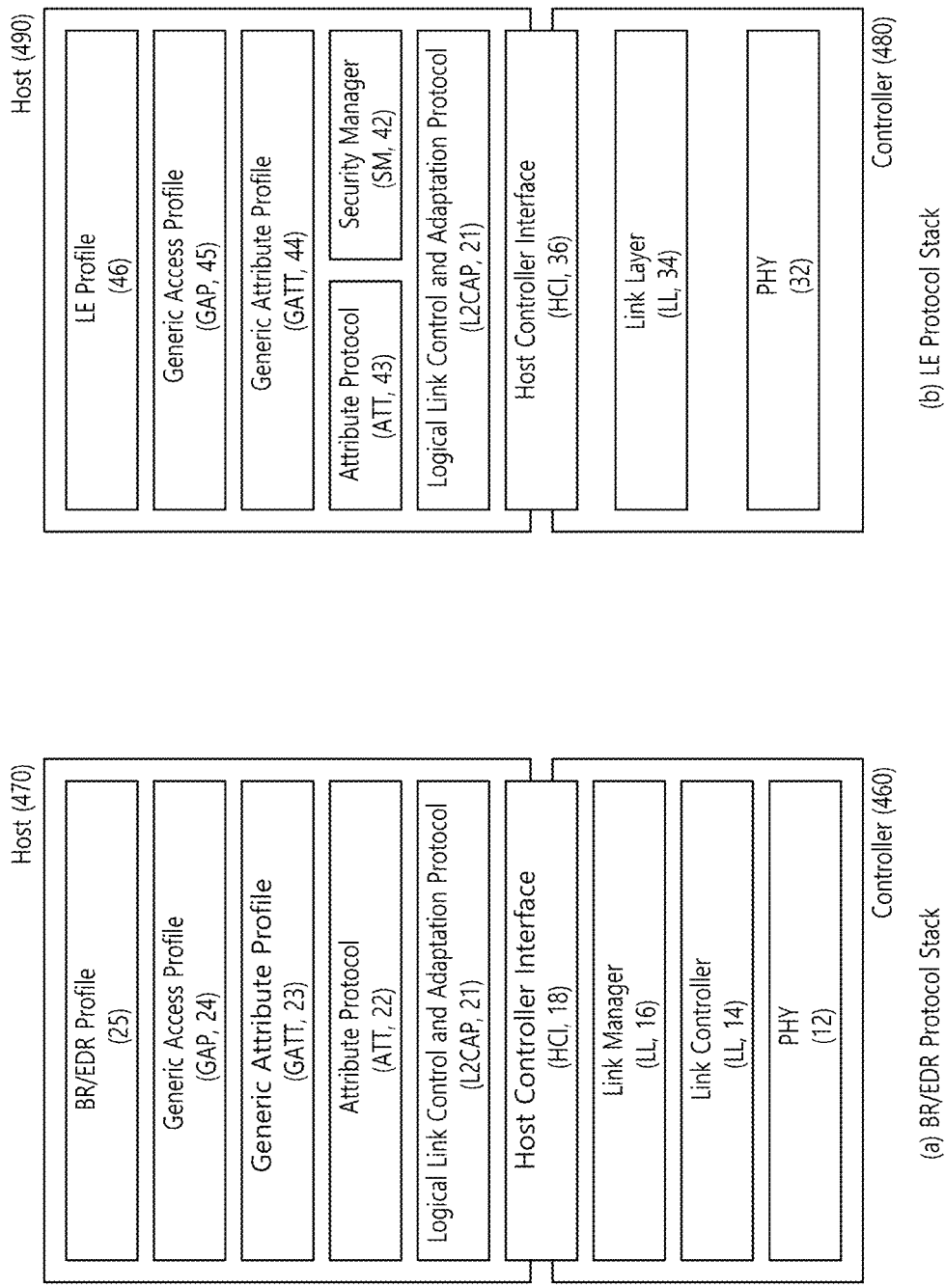
FIG. 6 is a diagram illustrating an example of a Bluetooth communication architecture to which an embodiment according to the present disclosure may be applied.

When the communication/control circuit 120 and the communication/control circuit 220 are Bluetooth or Bluetooth LE as an OB communication module or a short-range communication module, the communication/control circuit 120 and the communication/control circuit 220 may each be implemented and operated with a communication architecture as shown in FIG. 6.

FIG. 6 is a diagram illustrating an example of a Bluetooth communication architecture to which an embodiment according to the present disclosure may be applied.

Referring to FIG. 6, (a) of FIG. 6 shows an example of a protocol stack of Bluetooth basic rate (BR)/enhanced data rate (EDR) supporting GATT, and (b) shows an example of Bluetooth low energy (BLE) protocol stack.

Specifically, as shown in (a) of FIG. 6, the Bluetooth BR/EDR protocol stack may include an upper control stack 460 and a lower host stack 470 based on a host controller interface (HCI) 18.

The host stack (or host module) 470 refers to hardware for transmitting or receiving a Bluetooth packet to or from a wireless transmission/reception module which receives a Bluetooth signal of 2.4 GHz, and the controller stack 460 is connected to the Bluetooth module to control the Bluetooth module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of Bluetooth connection by utilizing a link manager protocol (LMP).

The link manager layer 16 may perform the following functions.

Performs ACL/SCO logical transport, logical link setup, and control.
Detach: It interrupts connection and informs a counterpart device about a reason for the interruption.
Performs power control and role switch.
Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper Bluetooth.

L2CAP of Bluetooth BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using Bluetooth BR/EDR and an application protocol for exchanging these data, and the generic access profile (GAP) 24 defines device discovery, connectivity, and security level.

As shown in (b) of FIG. 6, the Bluetooth LE protocol stack includes a controller stack 480 operable to process a wireless device interface important in timing and a host stack 490 operable to process high level data.

First, the controller stack 480 may be implemented using a communication module that may include a Bluetooth wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive Bluetooth packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper Bluetooth using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In Bluetooth LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type  | Packet Name      |
|-----------|------------------|
| 0000      | ADV_IND          |
| 0001      | ADV_DIRECT_IND   |
| 0010      | ADV_NONCONN_IND  |
| 0011      | SCAN_REQ         |
| 0100      | SCAN_RSP         |
| 0101      | CONNECT_REQ      |
| 0110      | ADV_SCAN_IND     |
| 0111-1111 | Reserved         |

Advertising PDU The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 5, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 7:
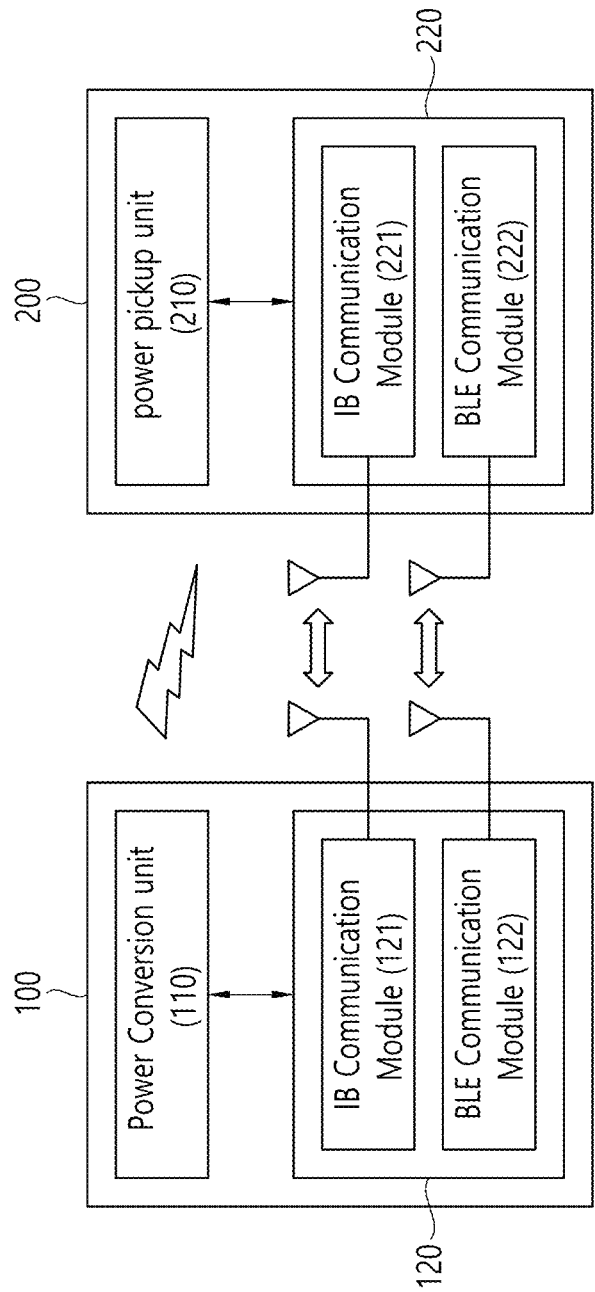
FIG. 7 is a block diagram illustrating a wireless power transfer system using BLE communication according to an example.

When the communication/control circuit 120 and the communication/control circuit 220 include Bluetooth or Bluetooth LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 7.

FIG. 7 is a block diagram illustrating a wireless power transfer system using BLE communication according to an example.

Referring to FIG. 7, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 6. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 8:
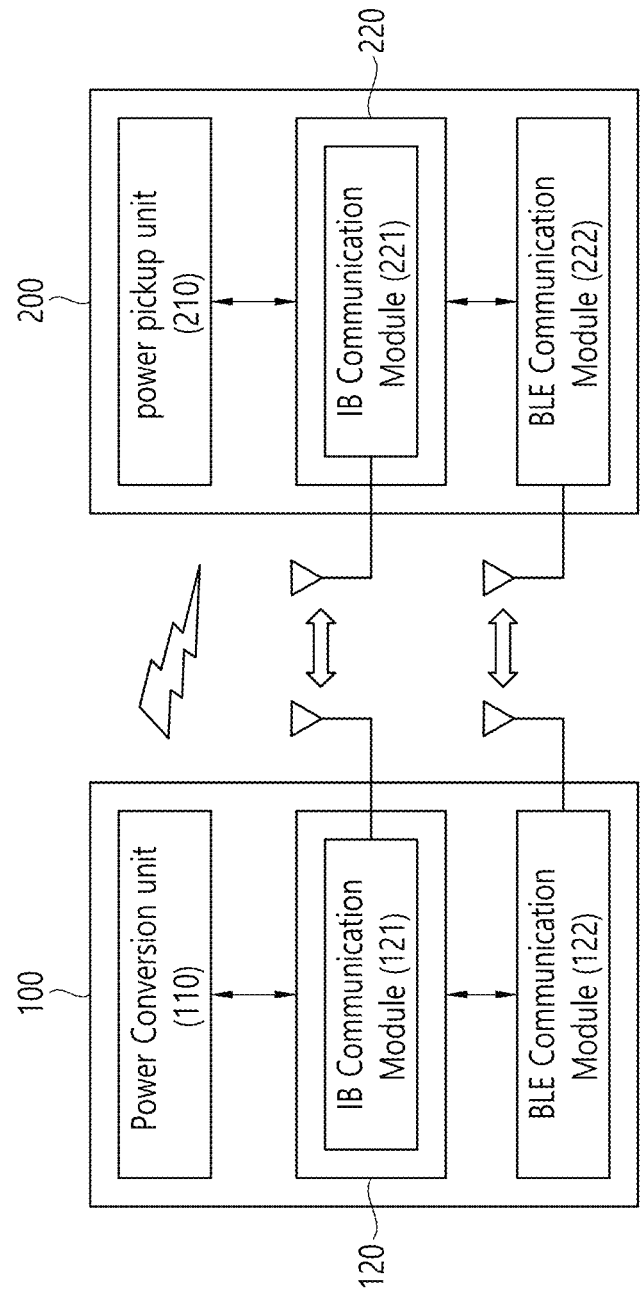
FIG. 8 is a block diagram illustrating a wireless power transfer system using BLE communication according to another example.

FIG. 8 is a block diagram illustrating a wireless power transfer system using BLE communication according to another example.

Referring to FIG. 8, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

Figure 9:
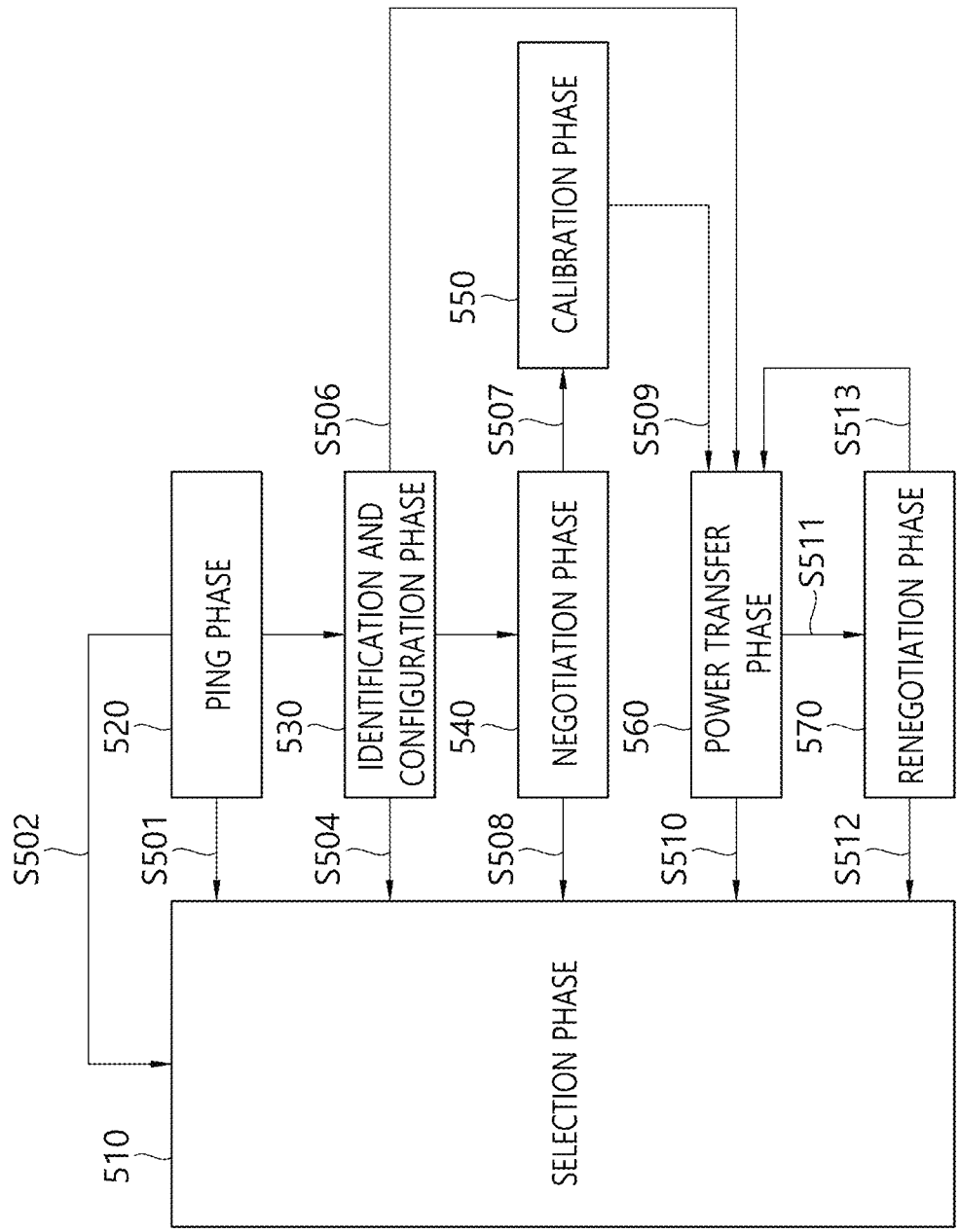
FIG. 9 is a state transition diagram for describing a wireless power transfer procedure.

FIG. 9 is a state transition diagram for describing a wireless power transfer procedure.

Referring to FIG. 9, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 10:
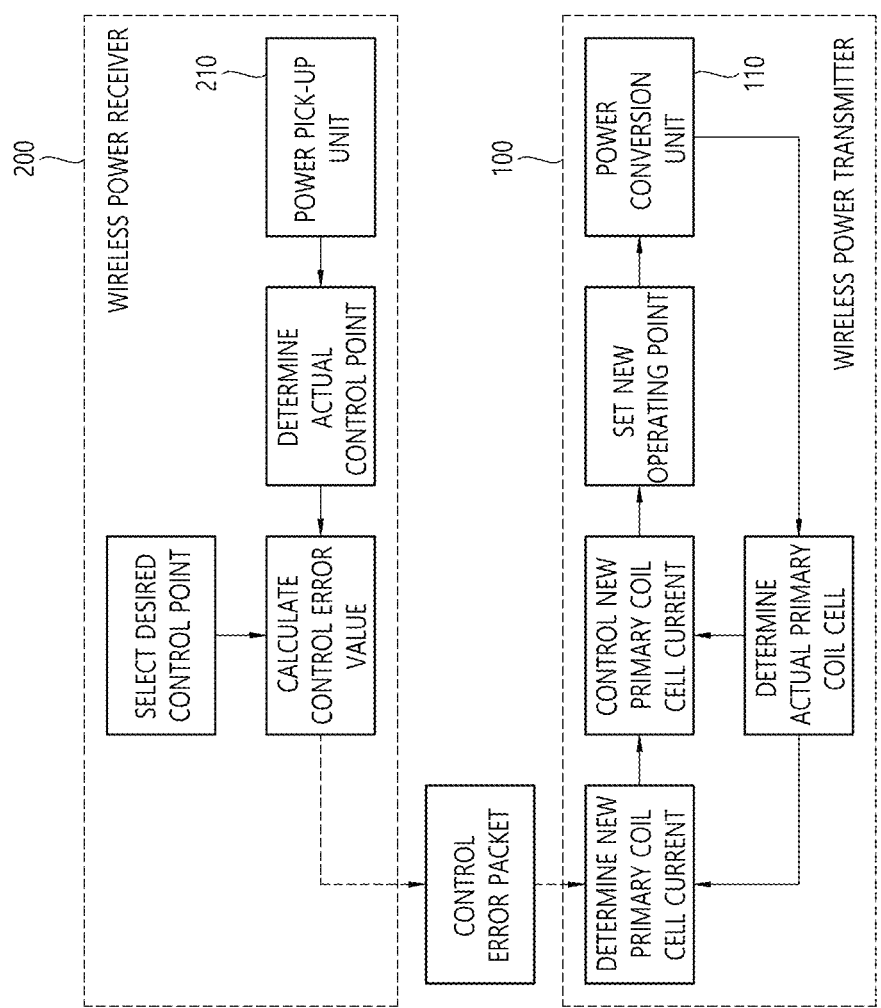
FIG. 10 shows a power control method according to an exemplary embodiment of the present disclosure.

FIG. 10 shows a power control method according to an exemplary embodiment of the present disclosure.

As shown in FIG. 10, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 10 will not be completely excluded. And, additional control of the transmitted power may be performed by using the method of FIG. 10.

Figure 11:
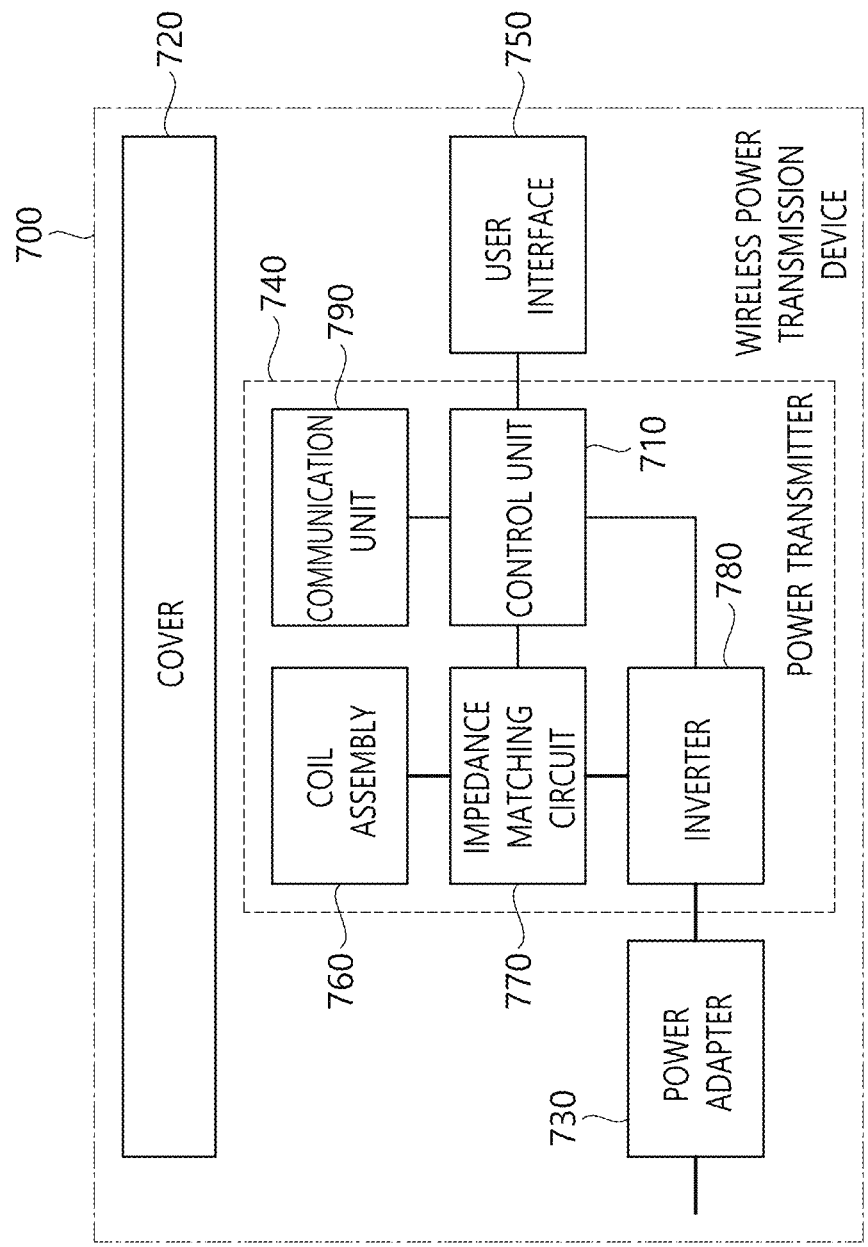
FIG. 11 is a block diagram of a wireless power transmitter according to another exemplary embodiment of the present disclosure.

FIG. 11 is a block diagram of a wireless power transmitter according to another exemplary embodiment of the present disclosure.

This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 11, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 12:
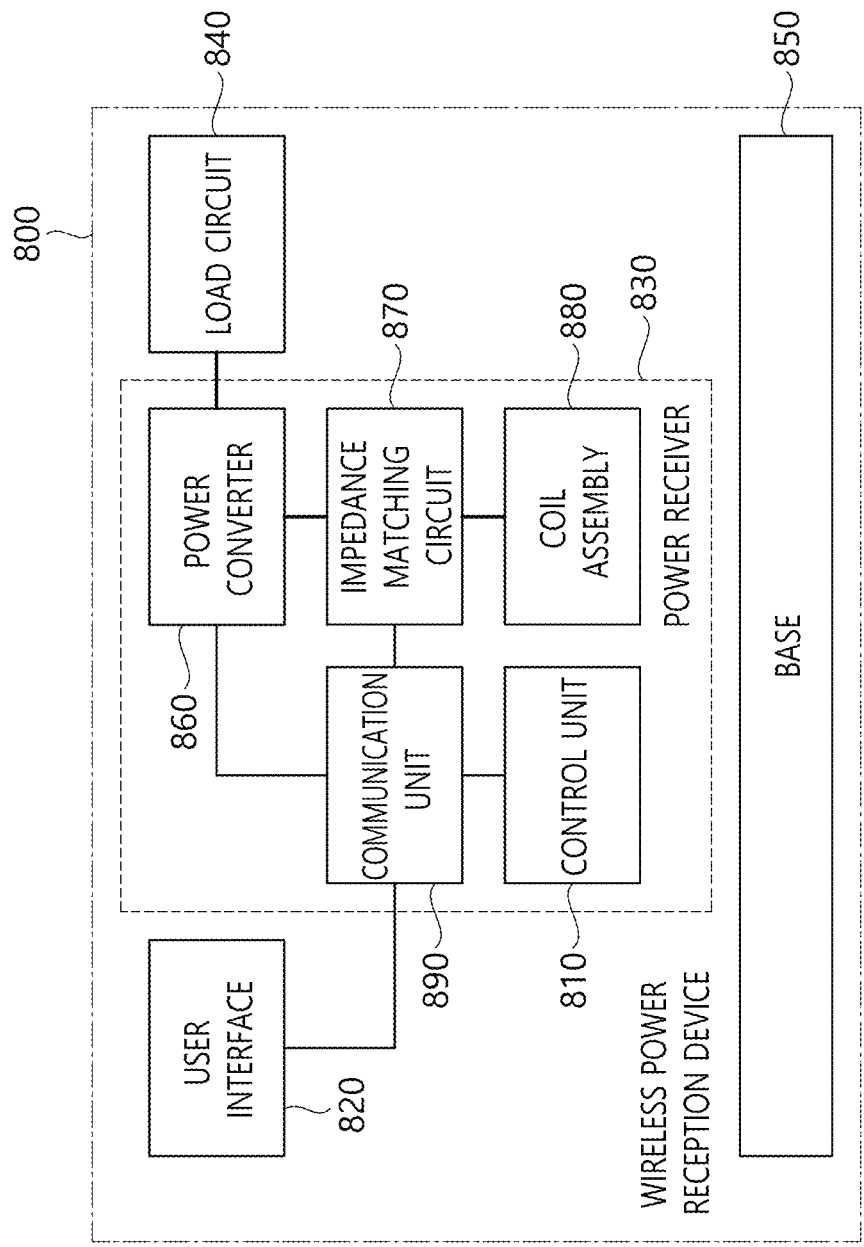
FIG. 12 shows a wireless power receiver according to another exemplary embodiment of the present disclosure.

FIG. 12 shows a wireless power receiver according to another exemplary embodiment of the present disclosure.

This may belong to a wireless power transfer system that is being operated in the magnetic resonance mode or the shared mode.

Referring to FIG. 12, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

As described in FIG. 9 etc., the wireless power transmitter and the wireless power receiver go through a Ping Phase and a Configuration Phase to enter the Negotiation Phase, or may go through a ping phase, a configuration phase, and a negotiation phase to enter a power transfer phase and then to a re-negotiation phase.

Figure 13:
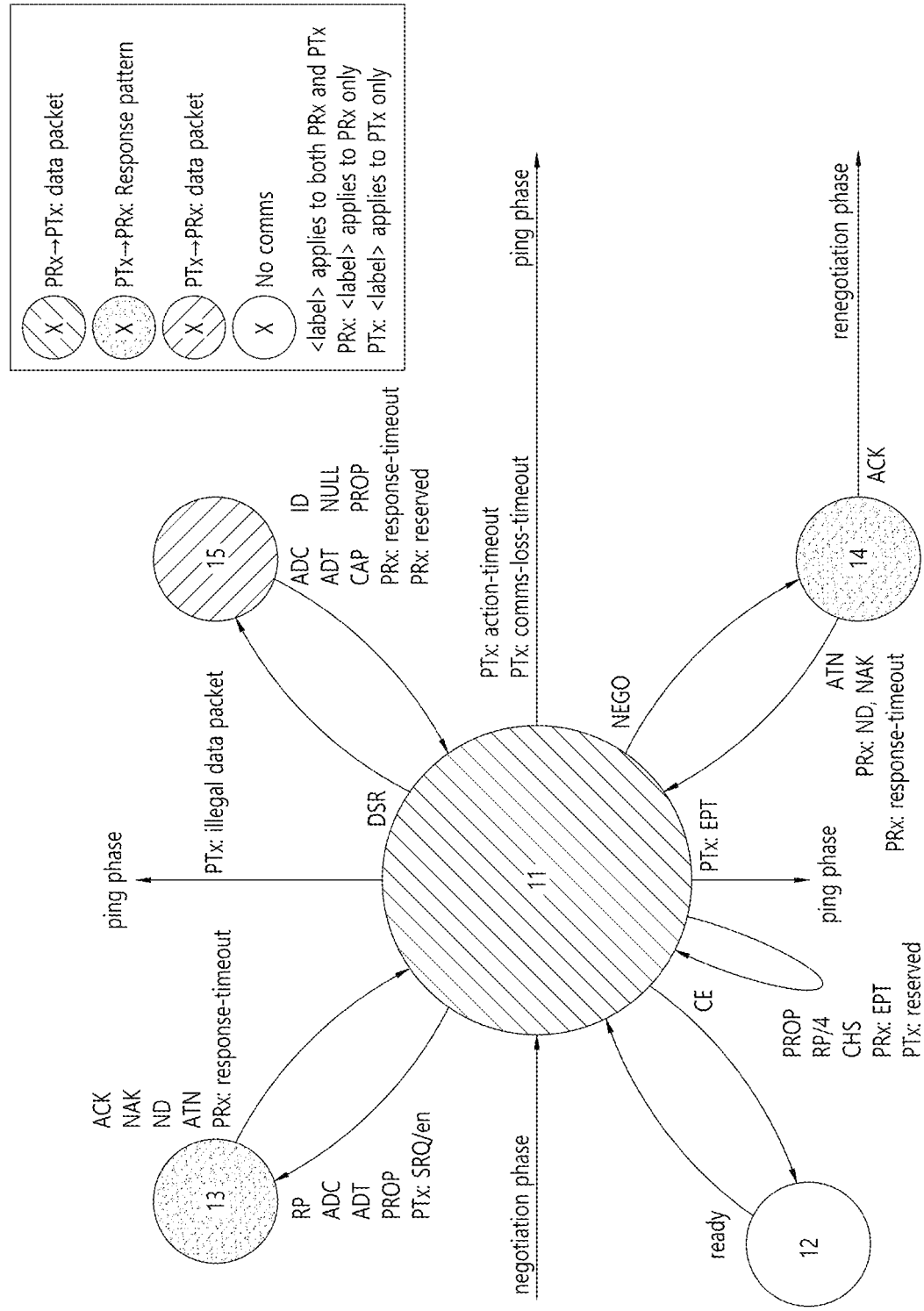
FIG. 13 schematically illustrates an example of a state diagram of a power delivery phase.

FIG. 13 schematically illustrates an example of a state diagram of a power delivery phase.

According to FIG. 13, the wireless power transmitter and the wireless power receiver may enter a power delivery phase after the negotiation phase.

Here, in state 11, the wireless power receiver and the wireless power transmitter may exchange data with each other. More specifically, state 11 is a process of sending data from the wireless power generator to the wireless power transmitter, and data packets such as RP, ADC, ADT, PROP, SRQ/en, DSR, and NEGO may be transmitted.

State 13 is a process in which the wireless power transmitter sends a response to the wireless power receiver, and the wireless power transmitter sends a response such as ACK/NAK/ND/ATN to the RP, ADC, ADT, and PROP in state 11.

State 15 is a process in which the wireless power transmitter sends data to the wireless power receiver. The wireless power transmitter may send data packets such as ADC, ADT, CAP, ID, NULL, and PROP to the wireless power receiver.

Here, received power (RP) may be information representing a received power level. In addition, although detailed information will be described later, ADC (Auxiliary Data Control) and ADT (Auxiliary Data Transport) may correspond to information included in a data transport stream. Here, the ADC may be information that is located at the front end of the data transport stream and start the data stream, and the ADT may be a data packet including an actual message.

Figure 14:
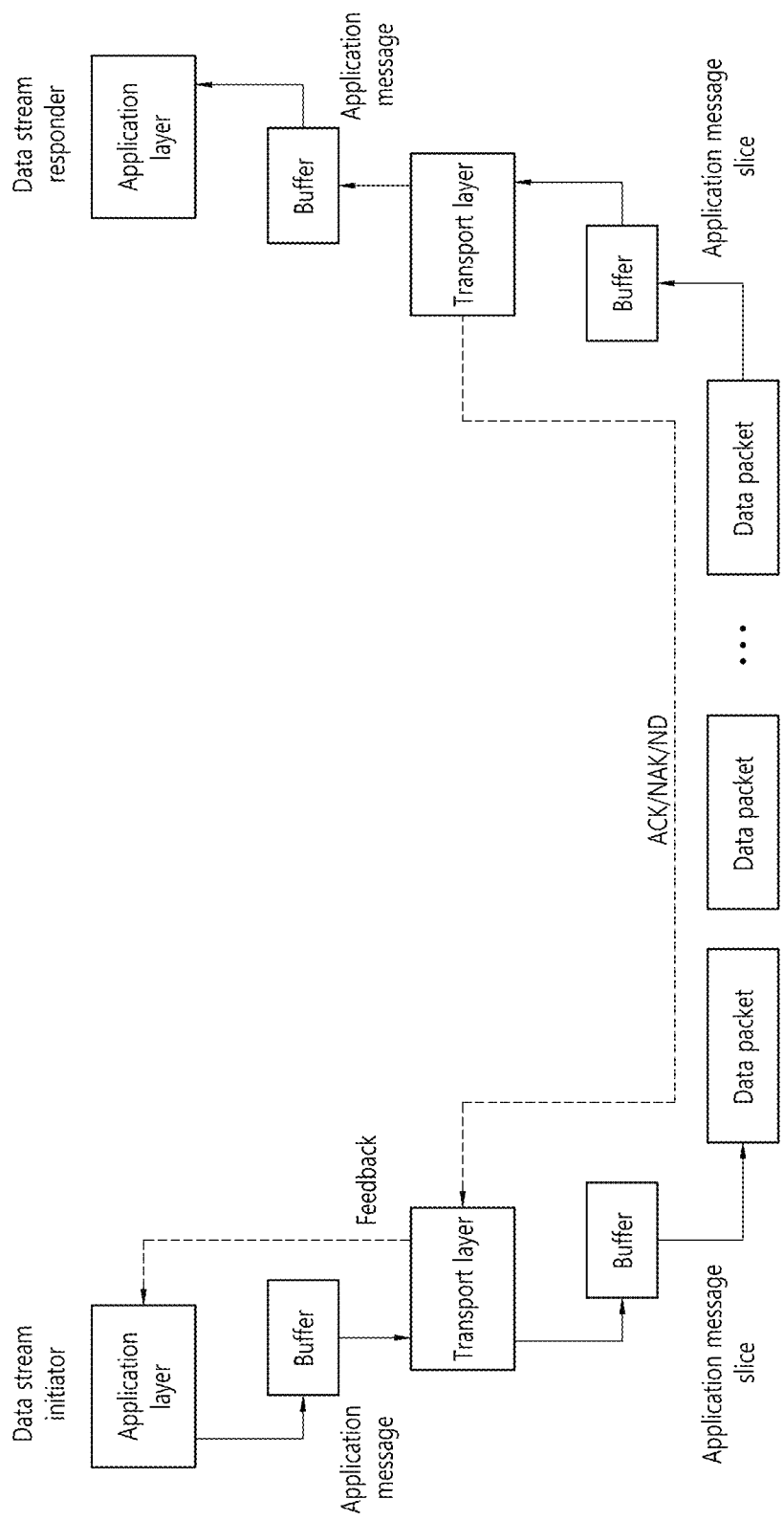
FIG. 14 illustrates a hierarchical architecture for transmitting/receiving an application level message between a wireless power transmitter and a wireless power receiver according to an example.

FIG. 14 illustrates a hierarchical architecture for transmitting/receiving an application level message between a wireless power transmitter and a wireless power receiver according to an example.

Referring to FIG. 14, a data stream initiator and a data stream responder transmit/receive a data transport stream in which an application level message is divided into a plurality of data packets using an application layer and a transport layer.

Both the wireless power transmitter 1010 and the wireless power receiver 1020 may be data stream initiators or responders. For example, when the data stream initiator is the wireless power receiver 1020, the data stream responder is the wireless power transmitter 1010, and when the data stream initiator is the wireless power transmitter 1010, the data stream responder is the wireless power receiver 1020.

The application layer of the data stream initiator creates an application level message (application message, for example, an authentication related message, etc.) and stores it in a buffer managed by the application layer. In addition, the application layer of the data stream initiator submits the application message stored in the buffer of the application layer to the transport layer. The transport layer of the data stream initiator stores the provided application message in a buffer managed by the transport layer. The size of the transport layer buffer may be at least 107 bytes, for example.

A transport layer of a data stream initiator transmits an application message to a data stream responder through a radio channel using a data transport stream. In this case, the application message is sliced into a plurality of data packets and transmitted. A plurality of data packets in which the application message is divided and transmitted consecutively may be referred to as a data transport stream.

If an error occurs during the transmission of data packets, the data stream initiator may retransmit the packet in which the error occurred, at this time, the transport layer of the data stream initiator may provide feedback on the success or failure of message transmission to the application layer.

A data stream responder receives a data transport stream over a radio channel. The received data transport stream is demodulated and decoded in the reverse process of the procedure in which the data stream initiator transmits the application message to the data transport stream. For example, the data stream responder stores data transport streams in a buffer managed by the transport layer, merges them, and transfers them from the transport layer to the application layer, the application layer can store the received message in a buffer managed by the application layer.

Figure 15:
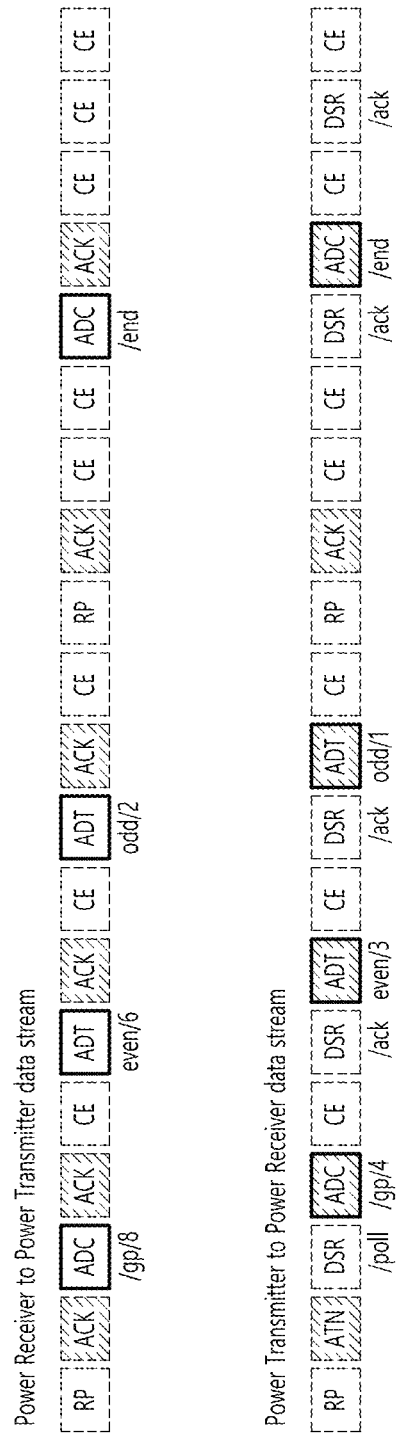
FIG. 15 illustrates a data transmission stream between a wireless power transmitter and a wireless power receiver according to an example.

FIG. 15 illustrates a data transmission stream between a wireless power transmitter and a wireless power receiver according to an example.

Referring to FIG. 15, a data transport stream may include an auxiliary data control (ADC) data packet and a plurality of consecutive auxiliary data transport (ADT) data packets.

The data stream initiator may start (open) a data transport stream using the ADC data packet and terminate the data transport stream. That is, the data stream initiator transmits an ADC data packet (ADC/gp/8) to start the data transport stream or request the start of the data transport stream, it transmits a plurality of ADT data packets in which the application message is slid, it may end the data transport stream by transmitting an ADC data packet (ADC/end) or request termination of the data transport stream.

Also, the data stream initiator may reset the data transport stream using the ADC data packet.

FIG. 16 is a diagram illustrating a format of a message field of an ADC data packet according to an embodiment, and FIG. 17 is a diagram illustrating a format of a message field of an ADT data packet according to an embodiment.

Referring to FIG. 16, the message field of an ADC data packet may consist of 2 bytes (an ADC data packet including a header is 3 bytes), and may include a byte B0 including a request field and a byte B1 including a parameter field.

The ADC data packet may be classified into an ADC starting a data transport stream (or requesting the start of a data transport stream), an ADC ending a data transport stream (or requesting an end of a data transport stream), and an ADC resetting a data transport stream (or requesting a reset of a data transport stream) according to the value of the request field. Also, according to the value of the request field, the ADC data packet can be distinguished from the ADC starting the data transport stream for transmitting which application message.

For example, an ADC data packet in which the value of the request field is 0 is an ADC (ADC/end) that terminates the data transport stream or requests termination of the data transport stream, an ADC data packet with a value of 2 in the request field is an ADC (ADC/auth) requesting to start a data transport stream that transmits an authentication-related message or start a data transport stream that transmits an authentication-related message, and an ADC data packet having a request field value of 5 may be an ADC (ADC/rst) that resets the data transport stream or requests reset of the data transport stream. ADC data packets whose request field value is any one of 0x10 to 0x1F may be an ADC (ADC/prop) that starts a data transport stream carrying data other than authentication (e.g. proprietary data) or requests the start of a data transport stream.

The ADC data packet may include information about the number of data bytes of the data transport stream. To this end, the parameter field of the ADC data packet starting the data transport stream may include information on the number of bytes of the data transport stream. A parameter field of an ADC terminating the data transport stream (ADC/end) and/or an ADC resetting the data transport stream (ADC/rst) may be set to 0.

Referring back to FIG. 15, the wireless power transmitter may respond with one of ACK, NAK, ND, and ATN to an ADC data packet transmitted from the wireless power receiver as a data stream initiator to the wireless power transmitter. The wireless power transmitter responds with an ACK when the request according to the received ADC data packet is successfully performed, it responds with NAK when it fails to perform a request according to the received ADC data packet, it responds with ND when the wireless power transmitter does not support the data transmission stream requested by the received ADC data packet, and it may respond with ATN when the wireless power transmitter requests permission of communication from the wireless power receiver.

To the ADC data packet transmitted by the wireless power transmitter as a data stream initiator to the wireless power receiver, the wireless power receiver may respond using a Data Stream Response (DSR) data packet having a 1-byte message field. For example, the wireless power receiver may respond with one of DSR/ack, DSR/nak, DSR/nd, and DSR/poll. The wireless power receiver responds with DSR/ack when the request according to the received ADC data packet is successfully performed, it responds with NAK when it fails to perform a request according to the received ADC data packet, it responds with ND when the wireless power receiver does not support the request by the received ADC data packet or the requested data transport stream, and it may respond with DSR/poll when the last data packet transmitted by the wireless power transmitter is not received.

Referring to FIG. 17, the message field of the ADT data packet includes an N-byte data field. The message field of the ADT data packet may have a size of 1 to 7 bytes. The data field contains fragments of application messages transmitted over the data transport stream. That is, the application message transmitted through the data transport stream is sliced into a plurality of ADT data packets and transmitted/received.

Referring back to FIG. 15, the wireless power transmitter may respond with one of ACK, NAK, ND, and ATN to the ADT data packet transmitted from the wireless power receiver as a data stream initiator to the wireless power transmitter. The wireless power transmitter responds with an ACK when the data in the received ADT data packet is correctly processed, it responds with NAK when it fails to process the data in the received ADT data packet, it responds with ND when there is no data transmission stream being received by the wireless power transmitter, and it may respond with ATN when the wireless power transmitter requests permission of communication from the wireless power receiver.

The wireless power receiver may respond to the ADT data packet transmitted by the wireless power transmitter as a data stream initiator to the wireless power receiver using a DSR data packet having a 1-byte message field. For example, the wireless power receiver may respond with one of DSR/ack, DSR/nak, DSR/nd, and DSR/poll. The wireless power receiver responds with DSR/ack when the data in the received ADT data packet is correctly processed, it responds with NAK when it fails to process the data in the received ADT data packet, it responds with ND when there is no data transport stream being received by the wireless power receiver, and it may respond with DSR/poll when the last data packet transmitted by the wireless power transmitter is not received.

The aforementioned data transport stream may be transmitted/received in the power transmission step.

However, in the power transfer phase, since the wireless power receiver 1020 repeatedly transmits the control error packet (CE) and the received power packet (RP) according to each required timing constraint, transmission or reception of the ADC data packet and/or the ADT packet of the data transport stream is performed within the interval of control error packets (CE) and the interval of received power packets (RP).

On the other hand, in the power transfer phase, the wireless power transmitter 1010 and the wireless power receiver 1020 communicate with each other only by in-band communication, communicate by mixing in-band communication and out-band communication, or communicate only by out-band communication.

The wireless power receiver 1020 may determine a communication mode to be used in the power transfer phase in a negotiation phase or a renegotiation phase.

Figure 18:
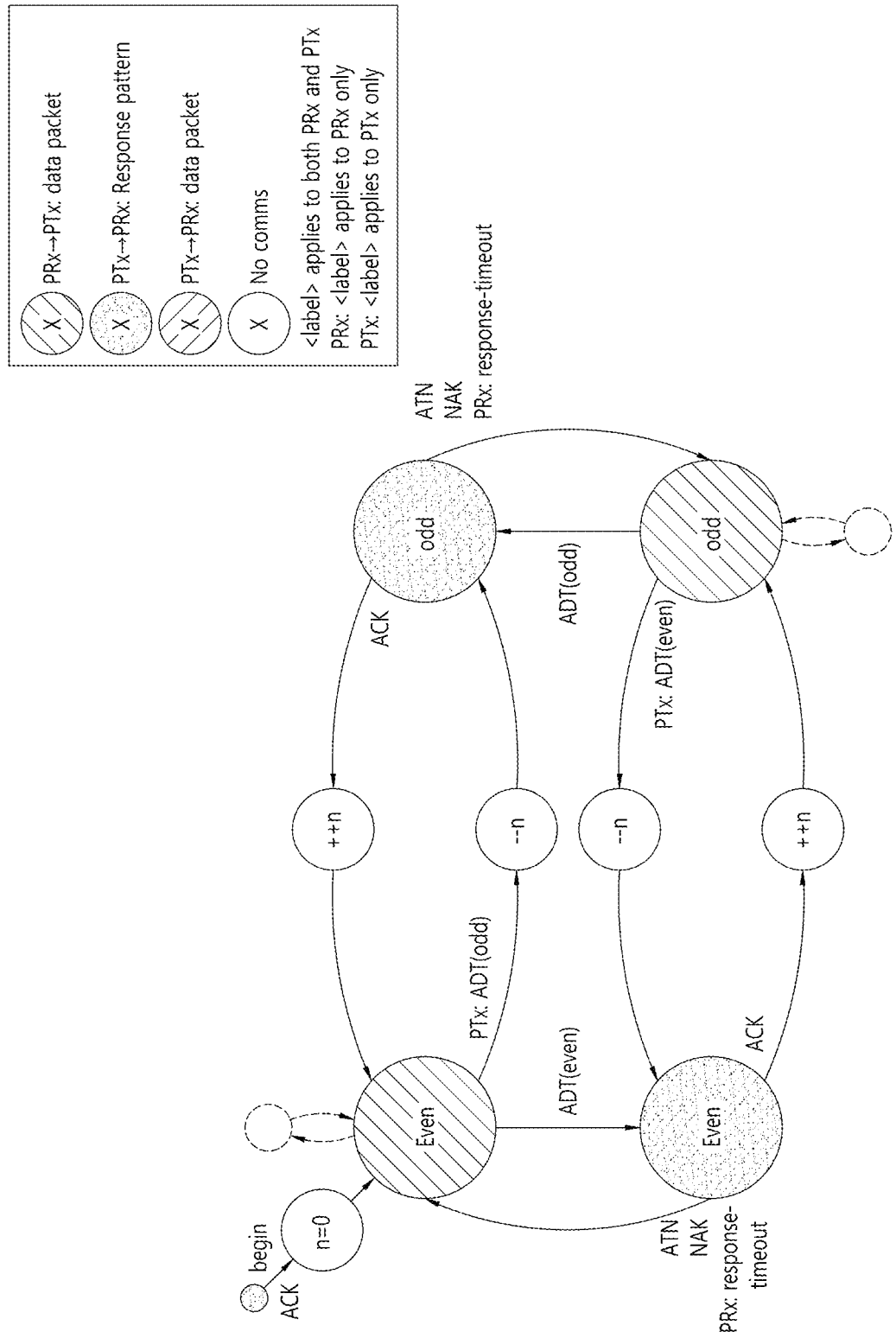
FIG. 18 and FIG. 19 show an example of an odd/even mechanism.
Figure 19:
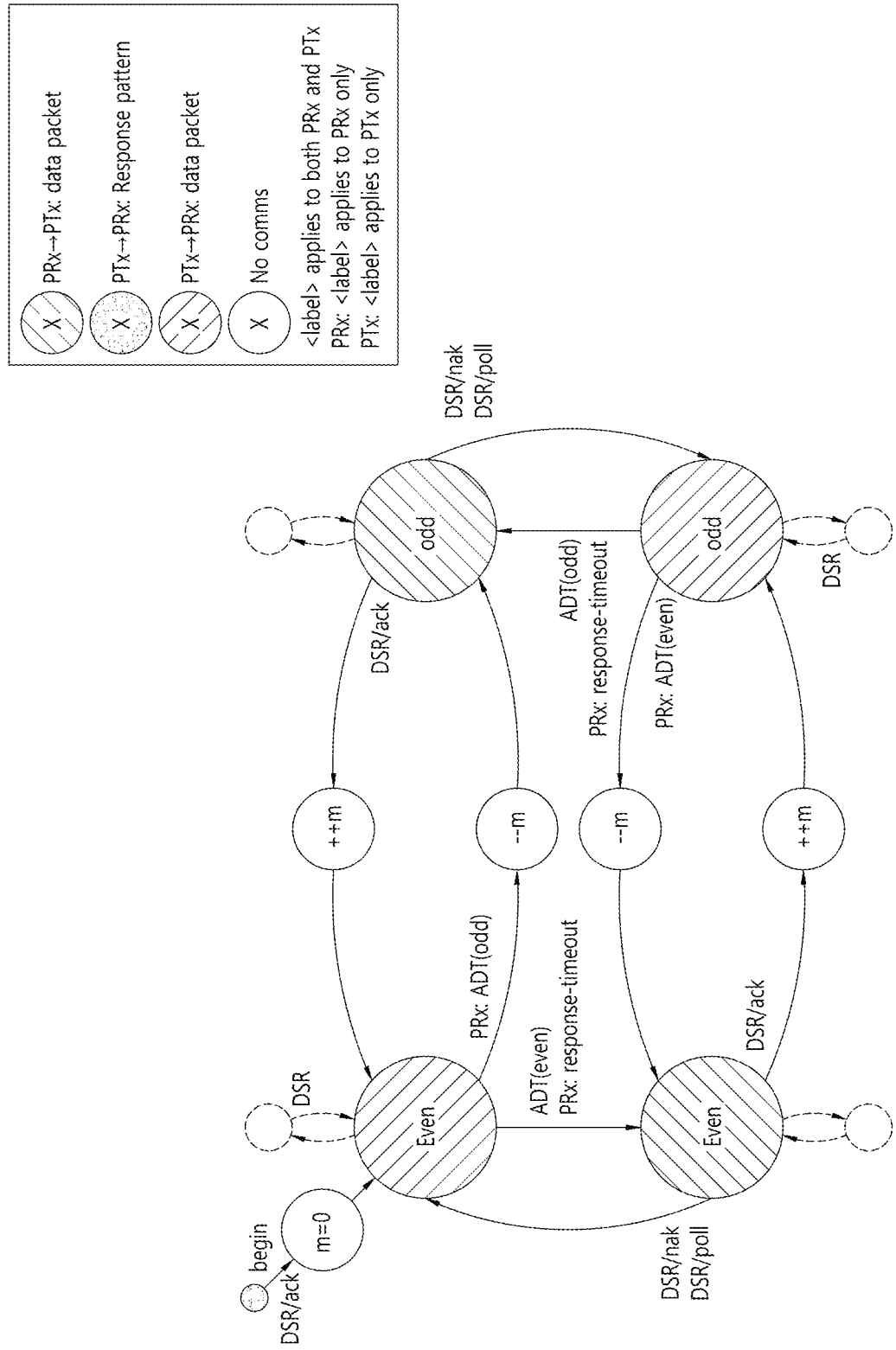

FIG. 18 and FIG. 19 show an example of an odd/even mechanism.

Here, FIG. 18 is an example of an odd/even mechanism of a data transport stream from a wireless power receiver to a wireless power transmitter, FIG. 19 is an illustration of an odd/even mechanism of a data transport stream from a wireless power transmitter to a wireless power receiver. Here, the odd/even mechanism may also be named, for example, a header toggle mechanism of a data packet (e.g., ADT).

More specifically, as described above, data transmission is largely composed of ADC/ADT, ADC indicates the start and end of data, and ADT contains the actual data. Here, as shown in FIGS. 18 and 19, an even/odd ADT mechanism exists to avoid redundant data transmission.

In order to transmit the ADT containing actual data, the ADT is transmitted as an even header, and then data may be transmitted in the order of odd-even-odd-even. As such, since the headers of ADT packets are transmitted alternately in odd/even numbers, when odd numbers are continuously transmitted or even numbers are continuously transmitted due to a communication error/failure in the middle, the wireless power receiver/wireless power transmitter can know which data is being transmitted. That is, through the above algorithm, the wireless power receiver/wireless power transmitter can know which data is being transmitted.

Figure 20:
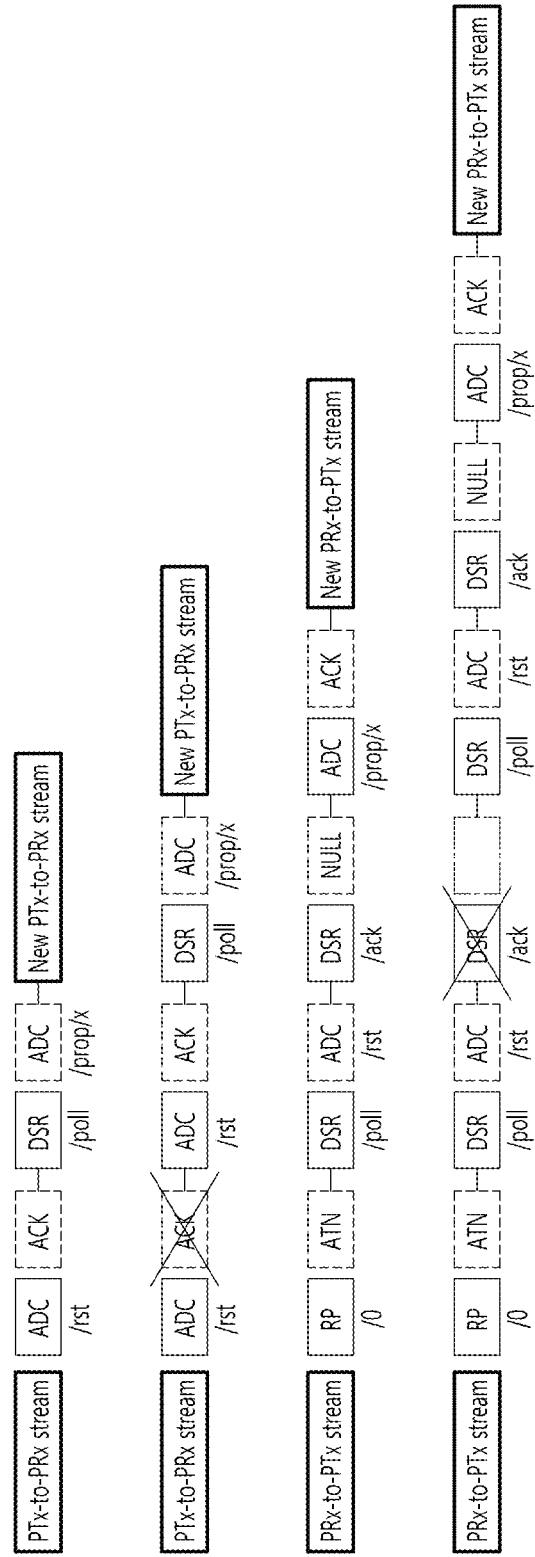
FIG. 20 schematically shows an example for resetting a data transport stream.

FIG. 20 schematically shows an example for resetting a data transport stream.

According to FIG. 20, a wireless power transmitter and/or a wireless power receiver may want to transmit a new data transport stream while a data transport stream is being transmitted. That is, the wireless power transmitter and/or wireless power receiver may want to reset data. In this case, an example of transmitting a new data stream is, for example, when an unexpected error occurs during data transmission.

Here, as shown in the figure, regardless of the wireless power transmitter/wireless power receiver, data currently being transmitted/received may be initialized through the ADC/rst packet. In other words, a new data stream may be initiated as the ADC/rst packet is transmitted by the wireless power transmitter, conversely, a new data stream may be initiated while the ADC/rst packet is transmitted by the wireless power receiver.

In addition, as shown in the second and fourth examples of FIG. 20, when there is no response to the transmission of the ADC/rst packet, the wireless power transmitter/wireless power receiver may retransmit the ADC/rst packet to the other party.

Hereinafter, this specification will be described in more detail.

Wireless charging methods include a magnetic induction method using a magnetic induction phenomenon between a primary coil and a secondary coil, and a magnetic resonance method in which magnetic resonance is achieved using a frequency in a band of several tens of kHz to several MHz to transmit power. Here, the wireless charging standard for the magnetic resonance method is led by a conference called A4WP, and the magnetic induction method is led by the WPC (Wireless Power Consortium). Here, the WPC is designed to exchange various status information and commands related to the wireless charging system in-band.

Meanwhile, the communication method used in WPC is classified as ASK/FSK, and the protocol is classified as BPP/EPP. BPP supports unidirectional communication of ASK communication from a wireless power receiver to a wireless power transmitter, and EPP supports bidirectional communication by adding FSK communication from a wireless power transmitter to a wireless power receiver in addition to ASK communication.

In WPC Qi v1.3, authentication is added and TPL (Data transport layer) function for exchanging data is added, so that data can be exchanged based on several algorithms.

At this time, in the current TPL (Data Transport Stream), problems such as communication error/communication loss/collision due to simultaneous communication (ASK/FSK simultaneous communication) occur between both sides performing communication, resulting in poor communication stability. In addition, during data communication, priorities between data communication and power control communication are unclear, so there is room for communication errors/collisions between data and power control communication.

For example, in data communication (TPL), two-way communication from wireless power receiver→wireless power transmitter/wireless power transmitter→wireless power receiver is supported, in the communication for power control (power control packet), only communication from a wireless power receiver to a wireless power transmitter is supported. For this reason, there is a possibility of collision between data communication and communication for power control in the current standard in which communication priority and communication authority are not set.

Hereinafter, various problems that may occur in communication according to current wireless charging will be described through drawings.

FIG. 21 to FIG. 30 schematically illustrate examples of problems that may occur in communication in a wireless charging system.

Figure 21:
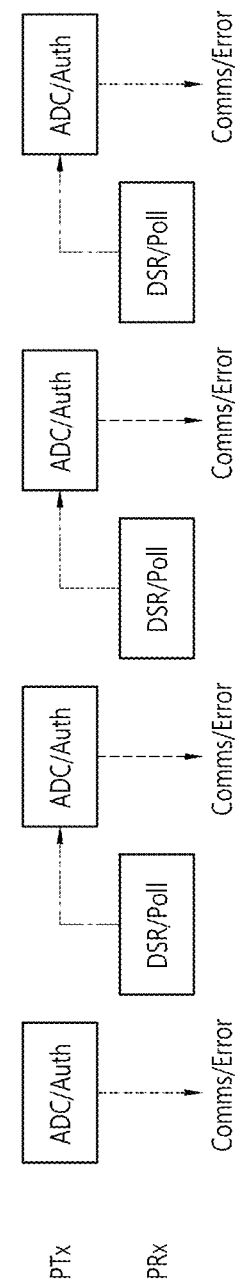
FIG. 21 to FIG. 30 schematically illustrate examples of problems that may occur in communication in a wireless charging system.

According to FIG. 21, in a situation where the wireless charging transmitter transmits ADC or ADT to the wireless charging receiver, the wireless power transmitter sends the ADT/ADC, but the wireless power receiver does not understand it.

In this case, since the wireless charging receiver did not understand the ADT or ADC transmitted by the wireless charging transmitter, the wireless power receiver may transmit DSR/Poll to the wireless charging transmitter. Then, based on the DSR/Poll received by the wireless charging transmitter, the wireless power transmitter sends the existing ADT/ADC back to the wireless charging receiver, but the wireless power receiver does not understand the received signal again, the wireless charging receiver may transmit DSR/Poll again. That is, in this situation, a problem may occur in which the wireless power transmitter and the wireless power receiver repeatedly transmit the same information.

Figure 22:
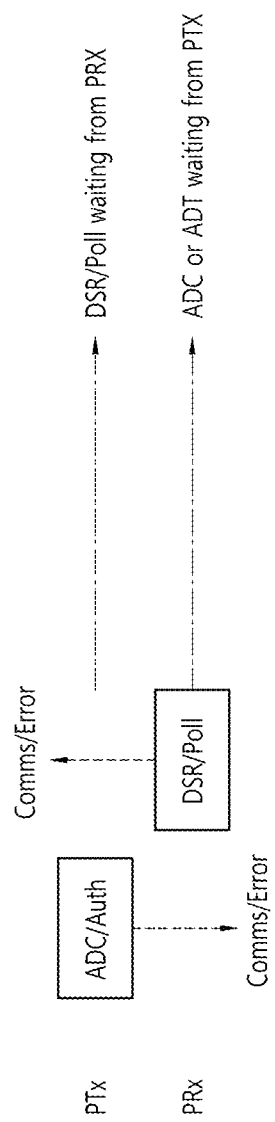

According to FIG. 22, in a situation where the wireless charging transmitter transmits ADC or ADT to the wireless charging receiver, the wireless power transmitter sends the ADT/ADC, but the wireless power receiver does not understand it. In addition, a situation may occur in which the wireless power receiver transmits the DSR/Poll to the wireless power transmitter, but the wireless power transmitter does not understand the DSR/poll transmitted from the wireless power receiver.

In other words, in a situation where the wireless power transmitter and the wireless power receiver exchange ADT/ADC, the wireless power receiver does not receive the ADC/ADT sent by the wireless power transmitter as Com/Error, the wireless power receiver transmits DSR/Poll to the wireless power transmitter, but the wireless power transmitter may not receive even the DSR/Poll due to a Com/Error. In this case, a problem in which the wireless power receiver/wireless power transmitter waits for each other's data indefinitely may occur.

Figure 23:
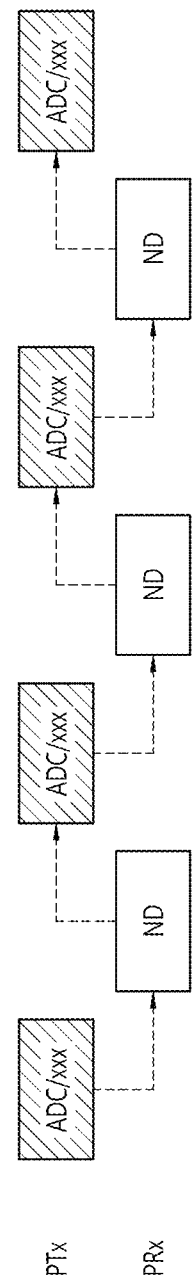

According to FIG. 23, there may be a situation in which undefined ADC/ADT is transmitted between a wireless power transmitter and a wireless power receiver.

In this case, when the wireless power transmitter or the wireless power receiver receives a data packet in which both ADC/ADT are not defined, a problem may occur in that the other party continues to transmit the ADC although the ND is transmitted to the other party.

Figure 24:
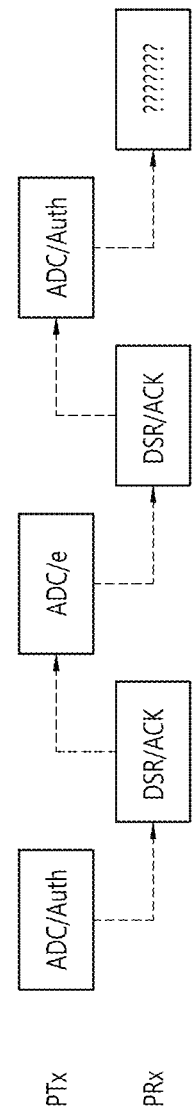

According to FIG. 24, there may be a situation in which the wireless power transmitter transmits the ADC to the wireless power receiver.

In this case, even though the wireless power receiver receives the ADC/Auth from the wireless power transmitter and the wireless power receiver transmits the DSR/ACK to the wireless power transmitter and the data stream is successfully opened, in the middle of the transmission of the data stream, the ADC may transmit again.

Figure 25:
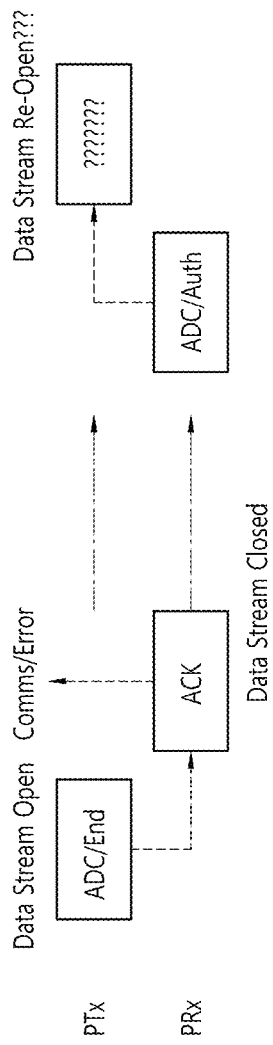

According to FIG. 25, after the wireless power transmitter transmits ADC/END to the wireless power receiver and the wireless power receiver receives the ADC/END, the wireless power receiver may transmit ACK to the wireless power transmitter. Thereafter, the wireless power receiver may not receive an ACK due to the occurrence of COM/ERROR even though the wireless power receiver closes the data stream. In this case, based on the fact that the wireless power transmitter did not close the data stream, but the wireless power receiver closed the existing data stream, the wireless power receiver may then transmit the ADC to the wireless power transmitter. In this case, a problem may be how the wireless power transmitter should interpret the ADC after receiving it from the wireless power receiver.

Figure 26:
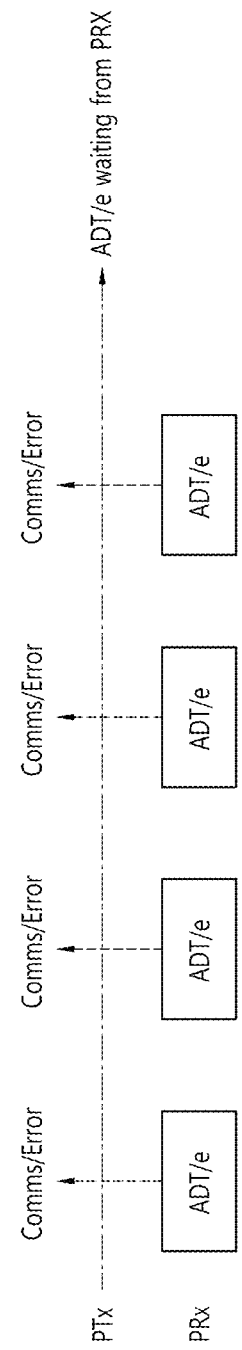

According to FIG. 26, although the wireless power receiver should alternately transmit ADT/E and ADT/O to the wireless power transmitter (that is, even/odd numbers should be toggled each time the ADT header is transmitted), data having the same header may be continuously transmitted.

Figure 27:
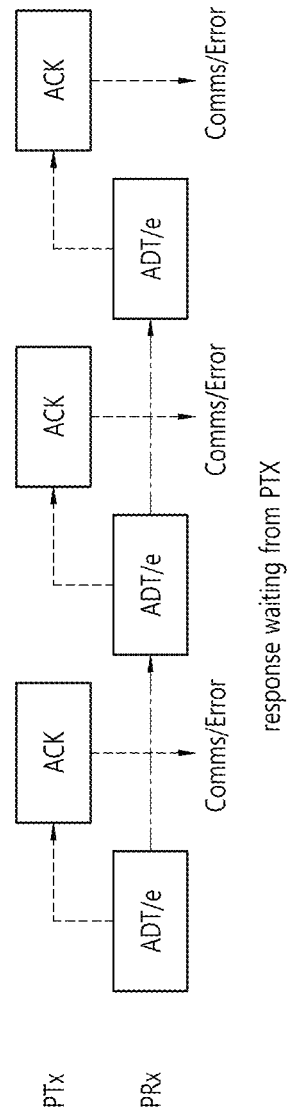

According to FIG. 27, although the wireless power receiver should alternately transmit ADT/E and ADT/O to the wireless power transmitter (that is, even/odd numbers should be toggled each time the ADT header is transmitted), another example may occur in which data having the same header is continuously transmitted.

Figure 28:
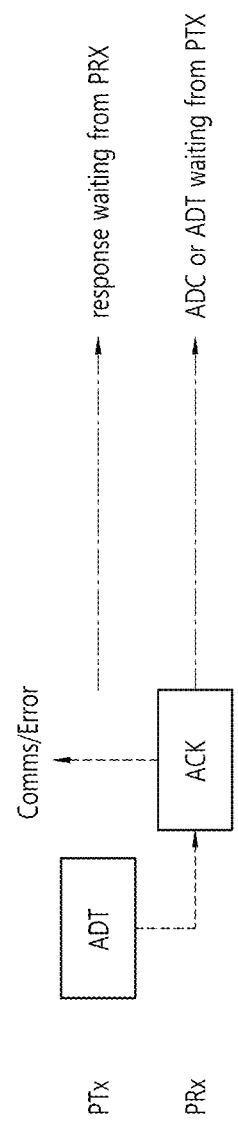

According to FIG. 28, when the wireless power transmitter transmits ADT to the wireless power receiver but does not receive a response from the wireless power receiver, how the wireless power transmitter operates may be a problem. For example, a problem may be that it is unclear whether the wireless power transmitter will transmit ATN or retransmit previously transmitted ADT/ADC, that is, data.

Figure 29:
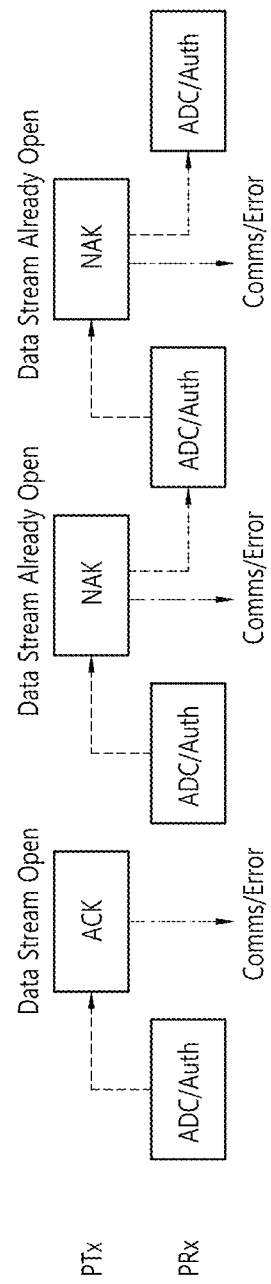

According to FIG. 29, after the wireless power receiver transmits the ADC to the wireless power transmitter and the wireless power transmitter receives the ADC, the wireless power transmitter may send an ACK to the wireless power receiver. At this time, although the stream is opened in the wireless power transmitter, the wireless power receiver may not receive a response (eg, ACK) due to Comm/error. In this case, the wireless power receiver again sends the ADC to the wireless power transmitter, but the wireless power transmitter has already opened the stream so that the wireless power transmitter can transmit Nak to the wireless power receiver, in this case, ADC/NAK may be infinitely repeated.

Figure 30:
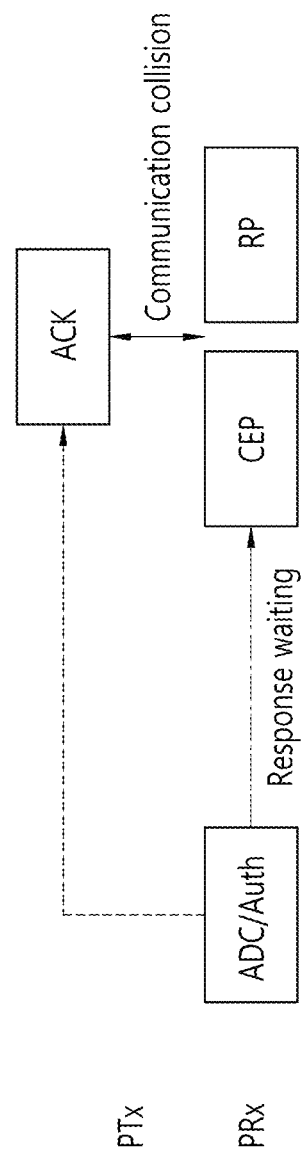

According to FIG. 30, after the wireless power receiver transmits a data packet to the wireless power transmitter and then waits for a response from the wireless power transmitter, or after sending a response to the wireless power transmitter and then waiting for the next data packet, the cep/rp interval may arrive. In this case, the wireless power receiver transmits a power control packet to the wireless power transmitter, and in the meantime, when data communication is received from the wireless power transmitter, that is, communication duplication may occur.

Figure 31:
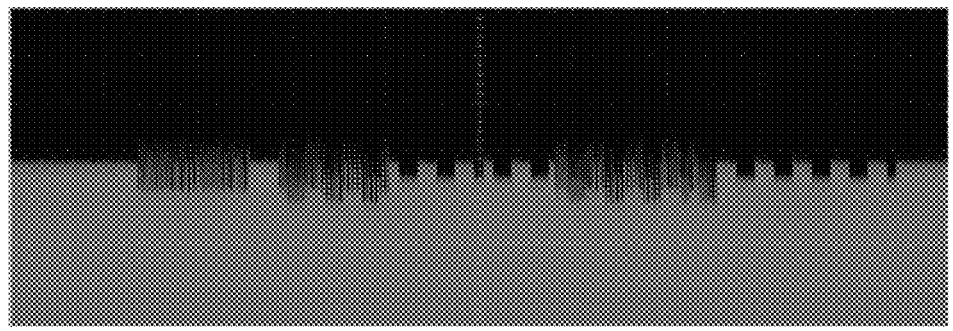
FIG. 31 expresses the problem according to the example of FIG. 30 in a different way.

FIG. 31 expresses the problem according to the example of FIG. 30 in a different way.

When the FSK response and the ASK CE packet collide as in the example of FIG. 30, the FSK response and the ASK CE packet may overlap as shown in FIG. 31.

As in this case, when FSK data (e.g., ADC, ADT, ACK, etc.) and ASK CE packets collide, a checksum error may occur in data transmitted between the wireless power transmitter/wireless power receiver. At this time, the wireless power transmitter/wireless power receiver may detect that an overlap (or collision) has occurred between the data packet and the CE packet based on the occurrence of the above checksum error. Here, the checksum error is only one example for describing the embodiments of the present specification. That is, the wireless power transmitter/wireless power receiver of the present specification may detect overlap/collision between packets through various methods.

The problems described so far and their causes can be summarized as follows.

The wireless power receiver/wireless power transmitter may perform data communication (TPL communication) and power control communication based on ASK/FSK communication, respectively.

Since TPL proceeds in the order of data/response and ADC/ADT/ADC, the open/close of the data stream proceeds, so there is no high possibility of data communication colliding with each other.

Since power control communication also proceeds in the order of CEP and RP/response, there is no possibility of collision between power control communications, and since the interval for each packet is quite long, the possibility of ASK/FSK communication colliding is also not high.

A problem is the possibility of communication conflict between data communication and power control communication. That is, since the TPL and power control communication do not have mutually defined rules as in the example of FIG. 30, communication between the two may collide.

That is, since most of the power control communication proceeds from the wireless power receiver to the wireless power transmitter, and the data communication proceeds from the wireless power transmitter to the wireless power receiver, in this case, power control communication and data communication may collide with search other.

Accordingly, as shown in FIG. 30, for example, since the wireless power receiver does not know when and for what time the wireless power transmitter performs data communication, when the interval in which the wireless power receiver needs to transmit the CEP arrives, the CEP can be transmitted to the wireless power transmitter. However, since the wireless power transmitter performs data communication because the wireless power transmitter does not know when the CEP is received, there may be cases in which wireless power communication and data communication collide.

In addition to the fact that there is no conventional protocol for coordinating the above FSK/ASK communication, the fact that the transmission period of the CE packet is determined within a specific range may also cause a data packet transmitted through FSK and a CE packet transmitted through ASK to collide. Hereinafter, the contents of the transmission period of the CE packet will be described.

FIG. 32 schematically illustrates an example of a transmission period of a CE packet.

According to FIG. 32, intervals and timeouts for CE packets may be defined from the perspectives of a wireless power transmitter and a wireless power receiver, respectively.

Here, the maximum time of the CE interval may have a value of 350 or 700, for example. In this case, in the case of 350, it may be applied to the baseline protocol. In addition, in the case of 350, when one or both of the power transmitter and power receiver report version 1.2 or lower in the ID data packet, it may also be applied to the extension protocol. In the case of 700, if both the power transmitter and power receiver report version 1.3 or higher in the ID data packet, the extension protocol may be applied, the power receiver may use t_interval>350 ms only if necessary to accommodate the data packets sent by the power transmitter.

Here, the WPC power control packet (e.g. ASK CE packet) may be periodically transmitted from the wireless power receiver to the wireless power transmitter.

At this time, signals of CE packets are generated at regular intervals, and accordingly, the CE packets are transmitted from the wireless power receiver to the wireless power transmitter at regular intervals. The period here may be set to 350 ms to 700 ms as shown in FIG. 32.

Meanwhile, in the above situation, the data packet transmitted by the wireless power transmitter must be transmitted between the CE packet and the CE packet. That is, the wireless power transmitter needs to send the data packet to the wireless power receiver so that the data packet and the CE packet do not overlap.

To this end, the wireless power transmitter must transmit as many data packets (e.g., ADC/ADT, etc.) as can be sent within the CE packet interval to the wireless power receiver. That is, by dividing the data stream into enough data information to be sent within the interval of the CE packet, the wireless power transmitter may prevent data packets of the wireless power transmitter and control packets of the wireless power receiver from colliding with each other.

At this time, as described above, the fact that the transmission period of the CE packet can be variably changed within 350-750 ms makes it difficult to prevent communication collisions between data packets and CE packets by transmitting data packets within the CE interval.

That is, the wireless power receiver arbitrarily selects the interval of the CE packet as any one value within the range of 350-700 ms, since the wireless power receiver regularly transmits CE to the wireless power transmitter based on the above interval, collisions between data packets and CE packets may occur as illustrated in FIG. 30.

In order to solve the above problem, the wireless power transmitter needs to know at what interval the wireless power receiver will send, for example, a CE packet. However, in the conventional case, a method for determining a CE packet interval of a wireless power receiver is not provided.

In addition, as described above, since the packet interval can be changed as needed according to the needs of the wireless power receiver, a criterion for the CE packet interval and an example capable of coordinating the CE packet interval between the wireless power receiver and the wireless power transmitter are required. However, in the conventional case, the configuration for the above reference and tuning method is not provided.

Accordingly, in the present specification, it is intended to provide a configuration that prevents FSK communication and ASK communication from colliding, that is, a configuration in which data packets transmitted from the wireless power transmitter to the wireless power receiver and CE transmitted from the wireless power receiver to the wireless power transmitter do not collide with each other.

Furthermore, in this specification, it is intended to provide a configuration in which a data packet transmitted by a wireless power transmitter and a CE transmitted by a wireless power receiver do not collide with each other and transmit data packets more efficiently. To this end, it is intended to provide a configuration in which the wireless power transmitter transmits as many data packets as possible during an interval between CEs.

In addition, in the present specification, when the interval of the CE transmitted by the wireless power receiver is changed and a collision occurs between the data packet transmitted by the wireless power transmitter and the CE, it provides a configuration that solves the above collision problem.

The following drawings are made to explain a specific example of the present specification. Since the names of specific devices or names of specific signals/messages/fields described in the drawings are provided as examples, the technical features of the present specification are not limited to the specific names used in the drawings below.

Figure 33:
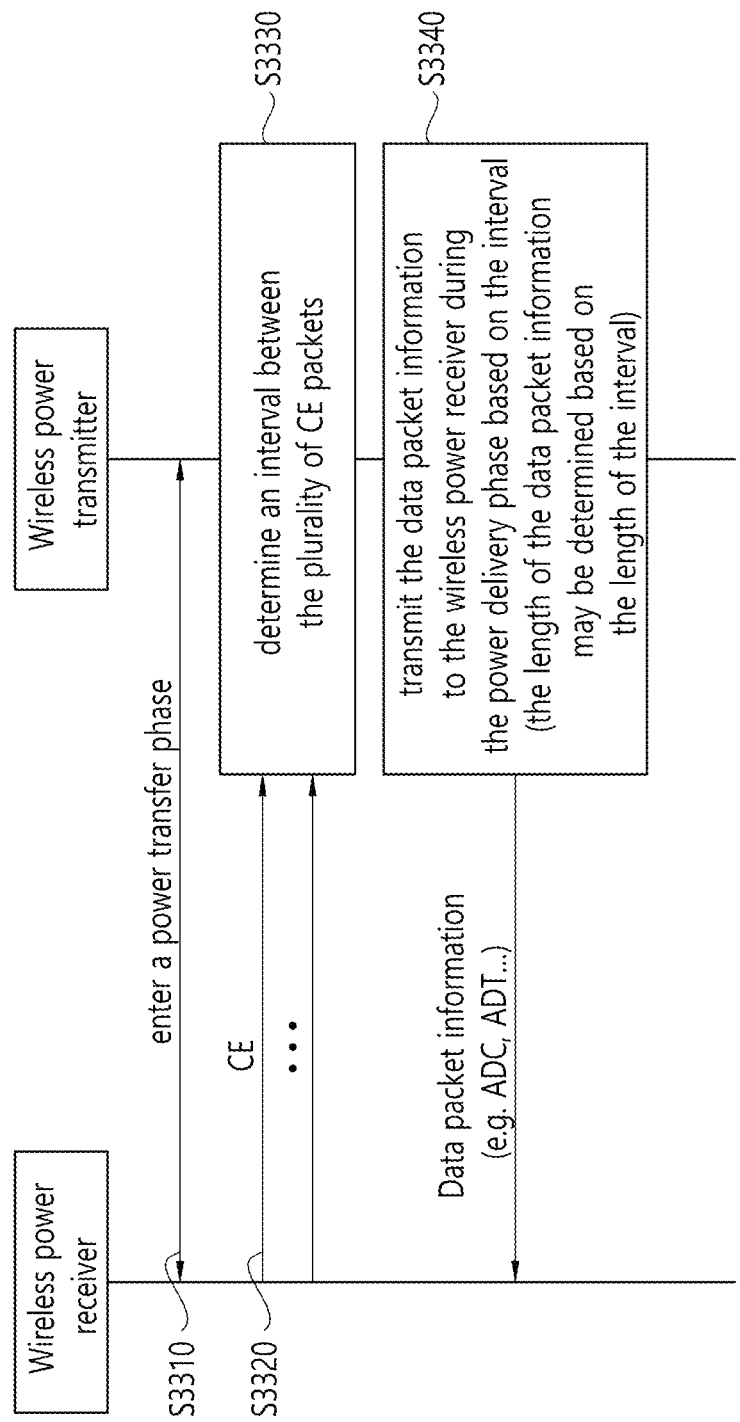
FIG. 33 is a flowchart of a method of transmitting data packet information according to an embodiment of the present specification.

FIG. 33 is a flowchart of a method of transmitting data packet information according to an embodiment of the present specification.

According to FIG. 33, the wireless power transmitter may enter a power transfer phase (S3310). As described above, an example of the power transfer phase is a phase in which wireless power is transferred from the wireless power transmitter to the wireless power receiver.

In this phase, for example, a data transport stream (e.g., information on authentication may be included) may be transmitted/received between the wireless power transmitter and the wireless power receiver through ADC/ADT. In addition, in this phase, the wireless power transmitter and the wireless power receiver may perform system calibration, performing system correction in this phase may be applied only to a protocol (e.g., EPP) of a higher version than BPP.

In addition, as described above, the power transfer phase may correspond to a phase after a ping phase, a configuration phase, and a negotiation phase, and each phase at this time is as described above.

The wireless power transmitter may receive a plurality of control error (CE) packets from the wireless power receiver during the power transfer phase (S3320). In this case, specific details of CE are as described above.

The wireless power transmitter may determine an interval between the plurality of CE packets (S3330). Here, when the wireless power transmitter determines the interval using a plurality of CE packets, the wireless power transmitter may determine the interval using only two CE packets, for example. That is, after the wireless power transmitter receives the first CE packet and then receives the second CE packet, by determining or sensing or measuring the interval between the first CE packet and the second CE packet, the CE interval may be determined or sensed or measured.

However, determining the CE interval based on two CEs by the wireless power transmitter is merely an example. That is, after receiving a preset/defined number of CEs, the wireless power transmitter may determine a CE interval based on each interval between the preset/defined number of CEs.

For example, after the wireless power transmitter receives the first CE, the second CE, and the third CE, based on the first interval, which is the interval between the first CE and the second CE, and the second interval between the second CE and the third CE, it may finally determine the CE interval. In this case, the finally determined CE interval may be, for example, an average of a plurality of candidate intervals (i.e., the first interval and the second interval).

Also, for example, the wireless power transmitter may calculate the CE interval based on only CEs received after a certain number of CEs have passed after ignoring a certain number of CEs. For example, when the wireless power transmitter receives the first CE, the second CE, and the third CE, the wireless power transmitter may calculate the CE interval based on the interval between the second CE and the third CE, ignoring the first CE, for example.

In addition, for example, as a result of calculating intervals between a plurality of CEs, when a specific interval value among a plurality of candidate intervals is equal to or greater than the threshold value (For example, this problem may occur when the wireless power transmitter does not receive a specific CE), the CE interval may be determined by excluding an interval value equal to or greater than the upper threshold value. The threshold value at this time may be defined in advance or set in advance in the wireless power transmitter and/or the wireless power receiver, for example.

Here, examples of determining the above interval may be separately applied. However, the above examples do not necessarily have to exist separately, and each example may be combined with each other.

The wireless power transmitter may transmit the data packet information to the wireless power receiver during the power delivery phase based on the interval (S3340). In this case, the length of the data packet information may be determined based on the length of the interval. And, the wireless power transmitter may transmit the data packet information to the wireless power receiver during the interval.

Here, the data packet information may include at least one of at least one Auxiliary Data Control (ADC) and at least one Auxiliary Data Transport (ADT). That is, data packet information may be composed of, for example, one ADC or one ADT according to the length of the interval. In addition, if the length of the above interval is sufficiently long, the data packet information may be composed of a plurality of ADCs or a plurality of ADTs (or composed of one ADC and a plurality of ADTs, or composed of a plurality of ADCs and one ADT).

If the example of FIG. 33 is expressed in another formula, it may be as follows.

Figure 34:
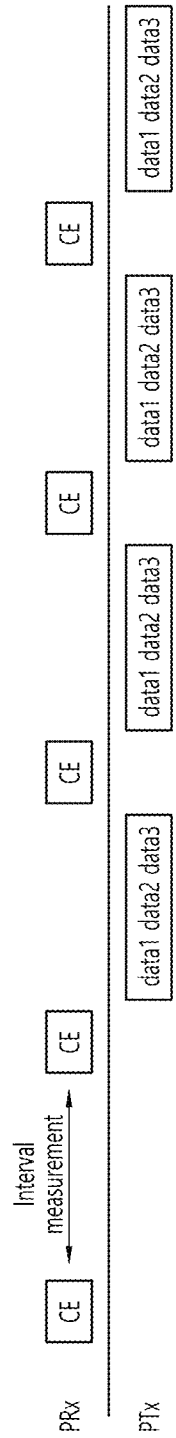
FIG. 34 is a flowchart of a method of transmitting data packet information, expressing the example of FIG. 33 in another way.

FIG. 34 is a flowchart of a method of transmitting data packet information, expressing the example of FIG. 33 in another way.

According to FIG. 34, a wireless power transmitter may receive CEs from a wireless power receiver. Also, when two CEs are received, the wireless power transmitter may measure an interval between the two CEs.

When the interval between CEs is determined as above, the wireless power transmitter may calculate an amount of data that can be transmitted within the determined CE interval and transmit data during the CE interval. For reference, in the example of FIG. 34, data 1, data 2, and data 3 are presented as examples of the amount of data that can be transmitted between CE intervals. Here, data 1, data 2, and data 3 may be ADC or ADT, respectively.

Meanwhile, as described above, after the wireless power transmitter determines the CE interval, the length of the CE interval may be changed.

In this case, to reflect the change of the CE interval (in particular, when the CE interval increases) as described above, the wireless power transmitter may periodically determine a new interval during the power transfer phase. Also, the length of the data packet information may be adjusted based on the length of the new interval.

As a specific example, based on the length of the new interval being longer than the length of the interval, the length of the data packet information may be adjusted to be longer than the previous one. Hereinafter, an example of a case where the CE interval is increased will be further described.

The following drawings are made to explain a specific example of the present specification. Since the names of specific devices or names of specific signals/messages/fields described in the drawings are provided as examples, the technical features of the present specification are not limited to the specific names used in the drawings below.

Figure 35:
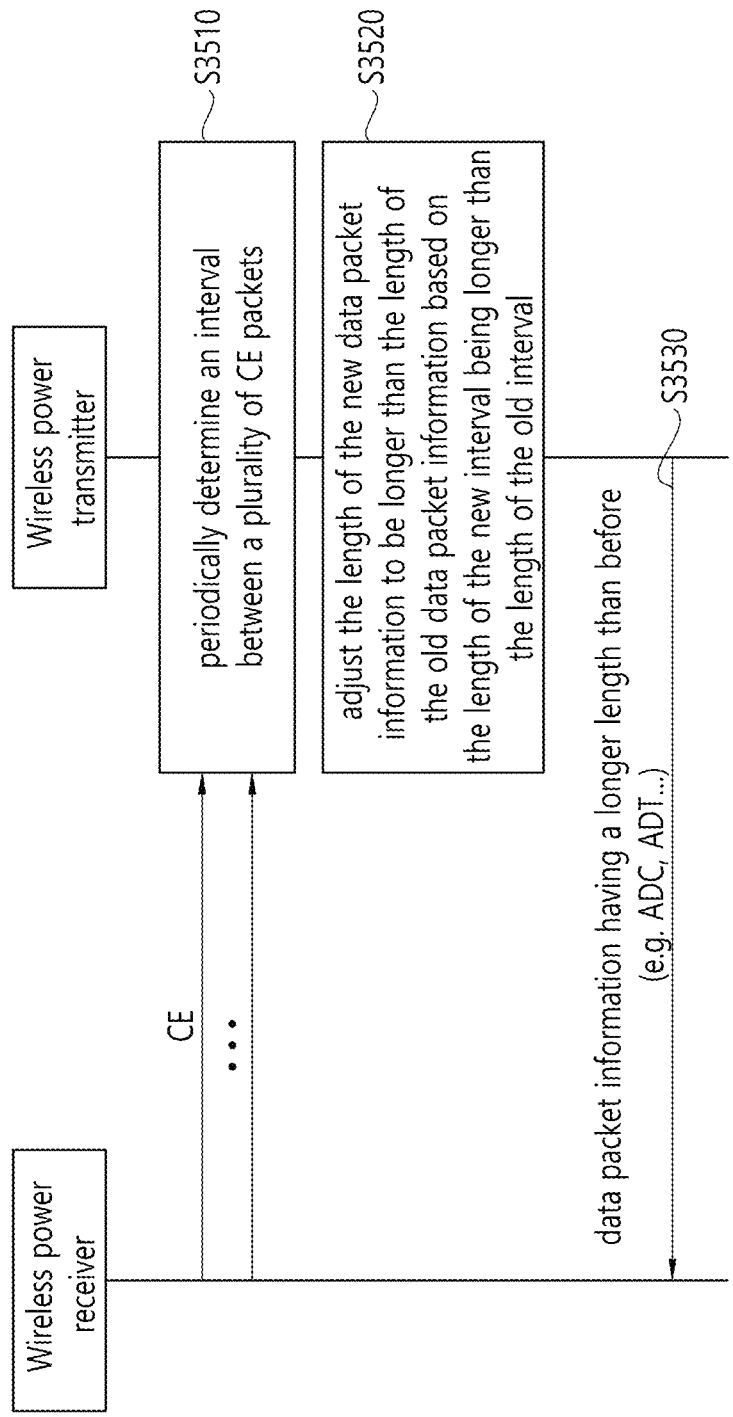
FIG. 35 is a flowchart of a method of transmitting data packet information according to another embodiment of the present specification.

FIG. 35 is a flowchart of a method of transmitting data packet information according to another embodiment of the present specification.

According to FIG. 35, the wireless power transmitter may periodically determine an interval between a plurality of CE packets (S3510). Here, a specific example of the CE packet is as described above.

Here, periodically determining an interval between CE packets may mean the following. When the wireless power transmitter determines/measures/detects the CE interval once, it transmits data packets within the determined/measured/detected CE interval for a while. And, the wireless power transmitter may repeatedly perform determination/measurement/sensing of the CE interval according to a specific period. In this case, a period in which the wireless power transmitter determines/measures/detects the CE interval may be previously set or defined in the wireless power transmitter and/or the wireless power receiver.

The wireless power transmitter may adjust the length of the new data packet information to be longer than the length of the old data packet information based on the length of the new interval being longer than the length of the old interval (S3520).

Here, with respect to how long the length of the data packet information is adjusted, the wireless power transmitter can increase the length of the data packet information to the extent that the maximum amount of data can be transmitted within the extended CE interval.

Thereafter, the wireless power transmitter may transmit data packet information having a longer length than before to the wireless power receiver (S3530). As described above, data packet information may be transmitted between extended CE intervals. And, the data packet information at this time may include, for example, at least one ADC and at least one ADT.

Meanwhile, the example of FIG. 35 may be combined with, for example, the examples of FIGS. 33 to 34 described above and/or the examples of FIGS. 37 to 38 to be described later. However, this only corresponds to an example of the specification, and in some cases, the example of FIG. 35 may be implemented as a separate embodiment.

If the example of FIG. 35 is expressed in another formula, it may be as follows.

Figure 36:
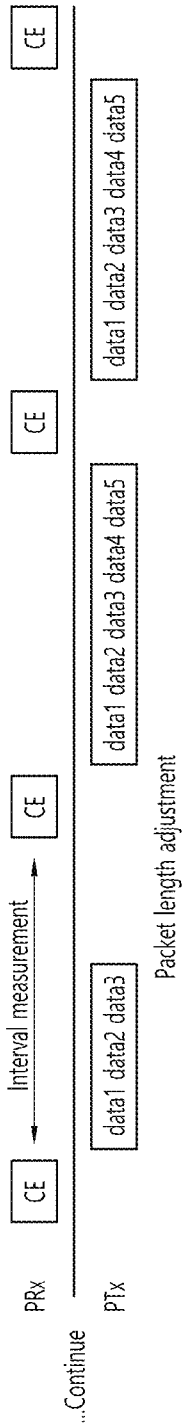
FIG. 36 is a flowchart of a method of transmitting data packet information, expressing the example of FIG. 35 in another way.

FIG. 36 is a flowchart of a method of transmitting data packet information, expressing the example of FIG. 35 in another way.

According to FIG. 36, the wireless power transmitter may (re)measure the CE interval when a specific period arrives. At this time, when the CE interval measured by the wireless power transmitter increases, the wireless power transmitter may transmit data packet information of an increased length to the wireless power receiver during the increased CE interval.

Here, in FIG. 36, an example where the wireless power transmitter previously transmitted data 1, data 2, and data 3 to the wireless power receiver during one CE interval, and then it transmits data 1, data 2, data 3, data 4, and data 5 to the wireless power receiver during one CE interval based on the extended CE interval is expressed.

Figure 37:
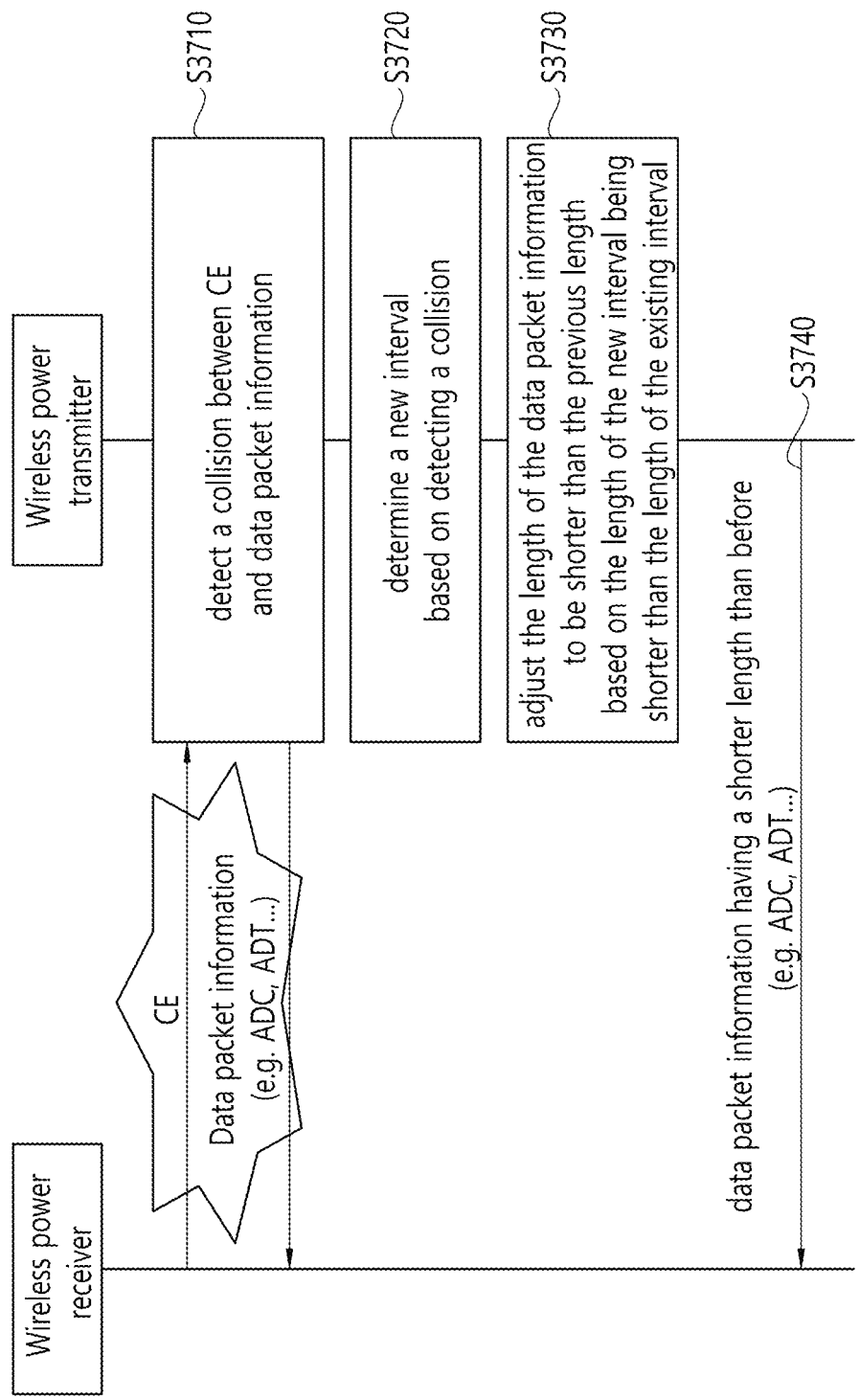
FIG. 37 is a flowchart of a method of transmitting data packet information according to another embodiment of the present specification.
Figure 38:
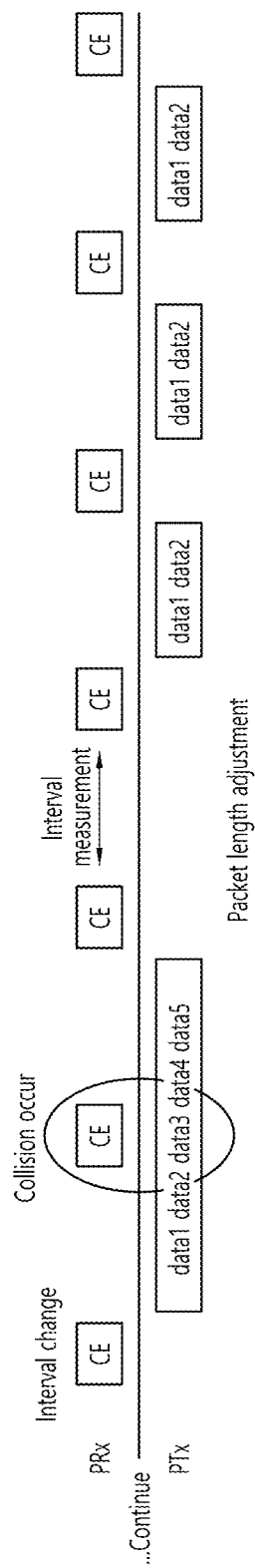
FIG. 38 is a flowchart of a method of transmitting data packet information, expressing the example of FIG. 37 in another way.

In FIG. 36, the content of 'Continue' is to express that the example of FIG. 36 may exist after the examples of FIGS. 33 to 34, or that the example of FIG. 36 may exist after, for example, FIGS. 37 to 38. That is, the example of FIG. 36 may be combined with the examples of FIGS. 33 to 34 and/or 37 to 38, for example.

In the examples of FIGS. 35 and 36, examples of adjusting the packet length when the length of the CE interval is increased are shown. However, this is merely an example of the present specification.

That is, in the present specification, when the CE interval is reduced while periodically measuring the CE interval, an example in which the wireless power transmitter transmits data packet information having a shorter length to the wireless power receiver according to the reduced CE interval is also provided.

Meanwhile, the interval between CE packets transmitted by the wireless power receiver is reduced, if the period in which the wireless power transmitter measures a new CE interval does not arrive, a data packet transmitted by the wireless power transmitter and a CE transmitted by the wireless power receiver may collide.

Accordingly, in the present specification, the wireless power transmitter detects a collision between a new CE received from the wireless power receiver and the data packet information, based on the detection of the collision, the wireless power transmitter determines a new interval, the length of the data packet information is adjusted based on the length of the new interval.

Here, based on the length of the new interval being shorter than the length of the interval, the length of the data packet information may be adjusted to be shorter than the previous one. In addition, based on the length of the interval being shorter than the specific length, the wireless power transmitter may not transmit the data packet information. Regarding the measurement of the new interval, the wireless power transmitter may determine the new interval after a specific number of additional CEs are received after detecting the collision.

Hereinafter, an example in which CE and data packet information collide will be described in more detail.

The following drawings are made to explain a specific example of the present specification. Since the names of specific devices or names of specific signals/messages/fields described in the drawings are provided as examples, the technical features of the present specification are not limited to the specific names used in the drawings below.

FIG. 37 is a flowchart of a method of transmitting data packet information according to another embodiment of the present specification.

According to FIG. 37, the wireless power transmitter may detect a collision between CE and data packet information (S3710). Here, specific examples of CE and data packet information are as described above, hereinafter, a method of detecting a collision of data packets, that is, determining whether a packet received by the wireless power transmitter is correctly received will be described in more detail.

Basically, a data packet received by the wireless power transmitter may include i) a preamble, ii) a header, iii) a message, and iv) a checksum.

Here, based on that i) the wireless power transmitter detects at least 4 preamble bits following the start bit, and/or ii) the wireless power transmitter does not detect a parity error in any one byte constituting the data packet (here, the byte may include a header byte, a message byte, and a checksum byte), and/or iii) the wireless power transmitter detects the stop bit of the checksum byte, and/or wireless power transmitter determines checksum bytes match, it may be determined whether the data packet received by the wireless power transmitter is properly received (whether the data packet received by the wireless power transmitter is properly received).

In this case, a method of determining whether the checksum bytes match may be as follows.

The checksum consists of a single byte that allows the wireless power transmitter to check for transmission errors. In addition, the wireless power transmitter may calculate the checksum through the following equation.

$$C := H \oplus B0 \oplus B1 \oplus \ldots \oplus B\_last \quad \text{[Equation 1]}$$

where C is the computed checksum, H is the header byte, B0, B1, . . . , B_last may indicate a message byte.

In the above situation, if the calculated checksum C and the checksum bytes included in the data packet do not match, the wireless power transmitter may determine that the checksums do not match. That is, the wireless power transmitter may determine (i.e., detect) an error of the data packet when the calculated checksum and the checksum bytes included in the data packet do not match.

The wireless power transmitter may determine a new interval based on detecting a collision (S3720). Here, a specific example of determining the new interval is as described above.

The wireless power transmitter may adjust the length of the data packet information to be shorter than the previous length based on the length of the new interval being shorter than the length of the existing interval (S3730).

Also, the wireless power transmitter may transmit data packet information having a shorter length than before to the wireless power receiver (S3740). As described above, data packet information at this time may also include at least one ADC and/or at least one ADT.

Meanwhile, the example of FIG. 37 may be combined with the examples of FIGS. 33 to 36 described above. However, this only corresponds to an example of the specification, and in some cases, the example of FIG. 37 may be implemented as a separate embodiment.

If the example of FIG. 37 is expressed in another formula, it may be as follows.

FIG. 38 is a flowchart of a method of transmitting data packet information, expressing the example of FIG. 37 in another way.

According to FIG. 38, the wireless power transmitter may determine that CE received from the wireless power receiver and data packet information transmitted by the wireless power transmitter collide. Thereafter, the wireless power transmitter may newly perform CE interval measurement based on the detection of the above collision.

The above collision may correspond to a collision that occurs because the CE interval is reduced. Accordingly, the wireless power transmitter may determine that the CE interval has decreased based on the above measurement.

If the length of the CE interval is shortened, the wireless power transmitter may adjust the length of data packet information according to the shortened interval. For example, the wireless power transmitter may shorten the length of data packet information according to the shortened interval. In the example of FIG. 38, an example where the wireless power transmitter previously transmits Data 1, Data 2, Data 3, Data 4, and Data 5 during the existing CE interval and the data collides with the CE received from the wireless power receiver is expressed. Further, in the example of FIG. 38, the wireless power transmitter may transmit only data 1 and data 2 corresponding to shorter data packet information to the wireless power receiver during the new CE interval in accordance with the reduced CE interval.

In FIG. 38, the content of 'continued' is to express that the example of FIG. 38 may exist after the examples of FIGS. 33 to 36, for example. That is, the example of FIG. 36 may be combined with the examples of FIGS. 33 to 34 and/or 37 to 38, for example.

So far, the embodiments of the present specification have been specifically described. In addition, the embodiments of the present specification described so far may be summarized as follows.

Since the wireless power receiver transmits CE packets at regular intervals, the wireless power transmitter may periodically monitor the interval of CE packets sent by the wireless power receiver after power transmission starts. And, based on the monitored period, the time and data length that the wireless power transmitter can use for data transmission can be determined.

If the wireless power receiver changes the CE packet interval to be small, then transmission of the first wireless power transmitter packet may fail. However, since the interval is measured again from transmission thereafter and the length of the wireless power transmitter packet is adjusted, normal data transmission can be resumed.

Summarizing once again, the configurations provided in this specification may be as follows. The wireless power transmitter measures the CE packet interval of the wireless power receiver. The wireless power transmitter calculates the length of data that can be transmitted based on the measured CE packet interval, divides the data length by the corresponding length, and transmits the data. When the wireless power receiver changes the CE packet interval, the wireless power transmitter calculates the data length again from the next CE packet and transmits data by the changed data length. If the wireless power receiver changes the CE packet interval to be smaller than the previous one, data overlap occurs again and the packet transmission fails. At this time, the wireless power transmitter measures the CE packet interval of the wireless power receiver again, adjusts the data length appropriately (short), and transmits the data packet.

Hereinafter, embodiments of the present specification will be described again from various subject points of view.

The following drawings are made to explain a specific example of the present specification. Since the names of specific devices or names of specific signals/messages/fields described in the drawings are provided as examples, the technical features of the present specification are not limited to the specific names used in the drawings below.

Figure 39:
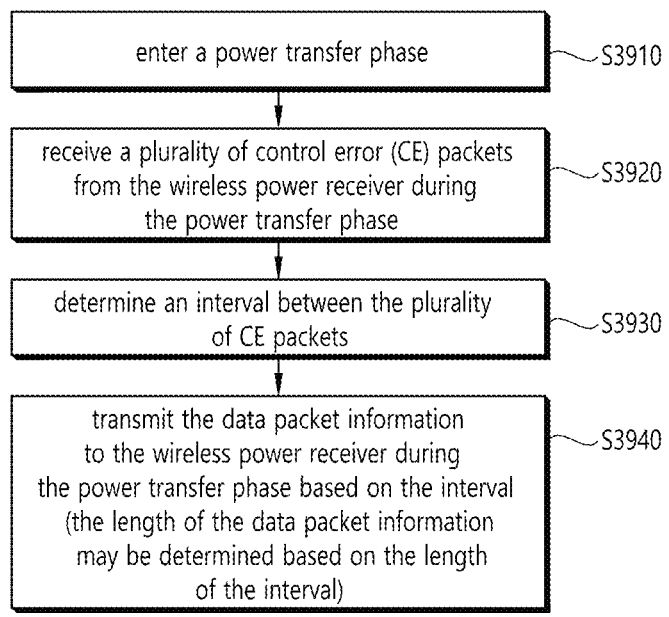
FIG. 39 is a flowchart of a method of transmitting data packet information from a wireless power transmitter perspective according to an embodiment of the present specification.

FIG. 39 is a flowchart of a method of transmitting data packet information from a wireless power transmitter perspective according to an embodiment of the present specification.

According to FIG. 39, the wireless power transmitter may enter a power transfer phase (S3910). A specific example for this is as described above.

The wireless power transmitter may receive a plurality of control error (CE) packets from the wireless power receiver during the power transfer phase (S3920). A specific example for this is as described above.

The wireless power transmitter may determine an interval between the plurality of CE packets (S3930). A specific example for this is as described above.

The wireless power transmitter may transmit the data packet information to the wireless power receiver during the power transfer phase based on the interval (S3940). Here, the length of the data packet information may be determined based on the length of the interval. A specific example for this is as described above.

Although not shown separately, the present specification may also provide the following examples. For example, the wireless power transmitter may include a power converter related to transmitting wireless power to a wireless power receiver and a communication/controller related to communicating with the wireless power receiver and controlling transmission of the wireless power. And the communication/controller is configured to enter a power transfer phase, is configured to receive a plurality of control error (CE) packets from a wireless power receiver during the power transfer phase, is configured to determine an interval between the plurality of CE packets, where the data packet information may be transmitted to the wireless power receiver during the power transfer phase based on the interval. In this case, the length of the data packet information may be determined based on the length of the interval. A specific example for this is as described above.

The following drawings are made to explain a specific example of the present specification. Since the names of specific devices or names of specific signals/messages/fields described in the drawings are provided as examples, the technical features of the present specification are not limited to the specific names used in the drawings below.

Figure 40:
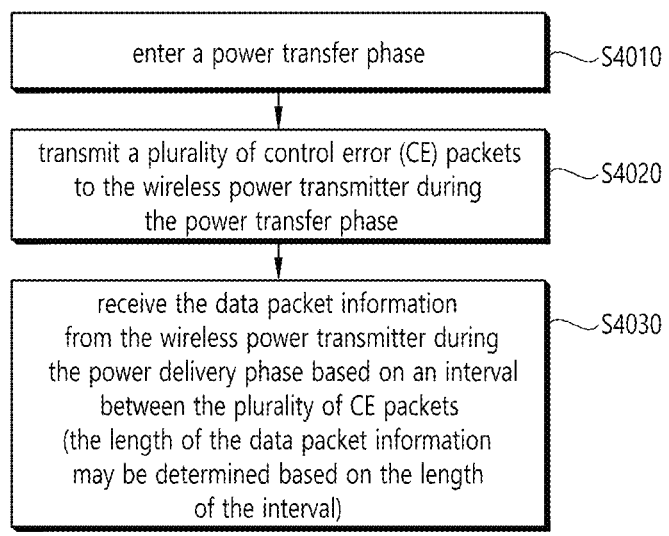
FIG. 40 is a flowchart of a method of receiving data packet information from the perspective of a wireless power receiver according to an embodiment of the present specification.

FIG. 40 is a flowchart of a method of receiving data packet information from the perspective of a wireless power receiver according to an embodiment of the present specification.

According to FIG. 40, the wireless power receiver may enter a power transfer phase (S4010). A specific example for this is as described above.

The wireless power receiver may transmit a plurality of control error (CE) packets to the wireless power transmitter during the power transfer phase (S4020). A specific example for this is as described above.

The wireless power receiver may receive the data packet information from the wireless power transmitter during the power delivery phase based on an interval between the plurality of CE packets (S4030). Here, the length of the data packet information may be determined based on the length of the interval. A specific example for this is as described above.

Although not shown separately, the present specification may also provide the following examples. For example, the wireless power receiver may include a power pickup related to receiving wireless power from the wireless power transmitter and a communication/controller related to communicating with the wireless power transmitter and controlling reception of the wireless power. And the communication/controller is configured to enter a power transfer phase, is configured to transmit a plurality of control error (CE) packets to a wireless power transmitter during the power transfer phase, is configured to receive the data packet information from the wireless power transmitter during the power transfer phase based on an interval between the plurality of CE packets. In this case, the length of the data packet information may be determined based on the length of the interval. A specific example for this is as described above.

So far, the embodiments of the present specification have been described. And according to the present specification, the following effects may exist. According to an embodiment of the present specification, even if the CE packet interval changes (wireless power receiver and/or wireless power transmitter), it can respond variably. Also, since the maximum data transmission length is actively calculated, the data transmission time can be minimized.

As in the present specification, when the CE packet interval is determined in the power delivery phase rather than the negotiation phase, the following effects may be obtained. For example, if the CE packet interval or the like is determined in advance in the negotiation phase, the CE packet interval (i.e., change of the CE packet interval) cannot be variably responded to during data transmission. In addition, since the time taken to start charging increases as the number of negotiation items increases, (determining the CE packet interval in the negotiation phase) may be undesirable. In contrast, in the present specification, since the CE packet interval is determined in the power transfer phase, the above problem can be solved.

In more detail, the effects of the present specification are described as follows. According to the present specification, since the wireless power transmitter can grasp the cycle of CE received from the wireless power receiver, the wireless power transmitter may transmit data packets (eg, ADT, ADC, etc.) to the wireless power receiver by avoiding the CE transmitted by the wireless power receiver. That is, according to the present specification, since a protocol for coordinating communication between FSK/ASK is provided, during communication between the wireless power receiver and the wireless power transmitter, an effect of reducing the possibility of communication collision may occur.

In addition, according to the present specification, the wireless power transmitter may determine an optimal data packet length to be transmitted to the wireless power receiver by periodically measuring the CE interval. Accordingly, when the length of the CE interval is increased, the wireless power transmitter can transmit more data than before in the same time period, thereby increasing data transmission efficiency. That is, according to the present specification, since the wireless power transmitter can transmit data without wasting (transmission/time) resources, data transmission efficiency can be increased.

In addition, the present specification provides a configuration in which the wireless power transmitter identifies the collision between the CE transmitted by the wireless power receiver and the data packet transmitted by the wireless power transmitter, an effect of preventing a communication error may occur. In particular, when the above collision occurs, the wireless power transmitter may reduce the length of a data packet transmitted during the CE interval to match the reduced CE interval. Due to this, according to the present specification, an effect of preventing a communication error from continuously occurring may occur.

Effects obtainable through specific examples of the present specification are not limited to the effects listed above. For example, there may be various technical effects that a person having ordinary skill in the related art can understand or derive from this specification. Accordingly, the specific effects of the present specification are not limited to those explicitly described in the present specification, and may include various effects that can be understood or derived from the technical features of the present specification.

The claims set forth herein can be combined in a variety of ways. For example, the technical features of the method claims of this specification may be combined to be implemented as a device, and the technical features of the device claims of this specification may be combined to be implemented as a method. In addition, the technical features of the method claims of the present specification and the technical features of the device claims may be combined to be implemented as a device, and the technical features of the method claims of the present specification and the technical features of the device claims may be combined to be implemented as a method.

What is claimed is:

1. A method for transmitting data packet information in a wireless power transfer system, the method performed by a wireless power transmitter and comprising:
    entering a power transfer phase;
    receiving a plurality of control error (CE) packets from a wireless power receiver during the power transfer phase;
    determining an interval between the plurality of CE packets; and
    transmitting the data packet information to the wireless power receiver during the power transfer phase based on the interval;
    wherein a length of the data packet information is determined based on a length of the interval.

2. The method of claim 1, wherein the wireless power transmitter transmits the data packet information to the wireless power receiver during the interval.

3. The method of claim 1, wherein the wireless power transmitter periodically determines a new interval during the power transfer phase,
    wherein the length of the data packet information is adjusted based on a length of the new interval.

4. The method of claim 3, wherein, based on the length of the new interval being greater than the length of the interval, the length of the data packet information is adjusted longer than before.

5. The method of claim 1, wherein the wireless power transmitter detects a collision between a new CE received from the wireless power receiver and the data packet information,
    wherein the wireless power transmitter determines a new interval based on detecting the collision,
    wherein the length of the data packet information is adjusted based on a length of the new interval.

6. The method of claim 5, wherein, based on the length of the new interval being less than the length of the interval, the length of the data packet information is adjusted shorter than before.

7. The method of claim 5, wherein, after detecting the collision, the wireless power transmitter determines the new interval after a specific number of additional CEs are received.

8. The method of claim 1, wherein, based on the length of the interval being shorter than a specific length, the wireless power transmitter does not transmit the data packet information.

9. The method of claim 1, wherein the data packet information includes at least one of at least one Auxiliary Data Control (ADC) and at least one Auxiliary Data Transport (ADT).

10. A wireless power transmitter, comprising:
    a power converter related to transferring wireless power to a wireless power receiver; and
    a communication/controller related to communicating with the wireless power receiver and controlling the transfer of the wireless power,
    wherein the communication/controller is configured to:
    enter a power transfer phase;
    receive a plurality of control error (CE) packets from the wireless power receiver during the power transfer phase;
    determine an interval between the plurality of CE packets; and
    transmit data packet information to the wireless power receiver during the power transfer phase based on the interval;
    wherein a length of the data packet information is determined based on a length of the interval.

11. A method for receiving data packet information in a wireless power transfer system, the method performed by a wireless power receiver and comprising:
    entering a power transfer phase;
    transmitting a plurality of control error (CE) packets to a wireless power transmitter during the power transfer phase;
    receiving the data packet information from the wireless power transmitter during the power transfer phase based on an interval between the plurality of CE packets;
    wherein a length of the data packet information is determined based on a length of the interval.

12. The method of claim 11, wherein the wireless power receiver receives the data packet information from the wireless power transmitter during the interval.

13. The method of claim 11, wherein the wireless power receiver determines a new interval, wherein the length of the data packet information is adjusted based on a length of the new interval.

14. The method of claim 13, wherein, based on the length of the new interval being greater than the length of the interval, the length of the data packet information is adjusted longer than before.

15. The method of claim 13, wherein, based on the length of the new interval being less than the length of the interval, the length of the data packet information is adjusted shorter than before.

16. The method of claim 11, wherein the data packet information includes at least one of at least one Auxiliary Data Control (ADC) and at least one Auxiliary Data Transport (ADT).

* * * * *